United States Patent
Ono et al.

(10) Patent No.: US 7,277,430 B2
(45) Date of Patent: ***Oct. 2, 2007

(54) SHORT CELL MULTIPLEXER

(75) Inventors: Hideaki Ono, Kawasaki (JP); Ryuichi Takechi, Kawasaki (JP); Tsuguo Kato, Kawasaki (JP); Hiroshi Sasaki, Sendai (JP); Takayuki Sasaki, Sendai (JP)

(73) Assignee: Fujitsu Limited, Kawasaki (JP)

( * ) Notice: Subject to any disclaimer, the term of this patent is extended or adjusted under 35 U.S.C. 154(b) by 1057 days.

This patent is subject to a terminal disclaimer.

(21) Appl. No.: 10/219,521

(22) Filed: Aug. 15, 2002

(65) Prior Publication Data

US 2003/0002514 A1    Jan. 2, 2003

Related U.S. Application Data

(63) Continuation of application No. 09/040,043, filed on Mar. 17, 1998, now Pat. No. 6,470,014.

(30) Foreign Application Priority Data

Sep. 11, 1997   (JP)   ................................ 9-247091

(51) Int. Cl.
    *H04L 12/56* (2006.01)
(52) U.S. Cl. ..................................... 370/389; 370/395.4
(58) Field of Classification Search ................ 370/368, 370/374, 378, 381, 386, 389, 395.1, 395.4, 370/395.7, 412, 413, 391, 396, 395.43, 395.52, 370/429, 428
    See application file for complete search history.

(56) References Cited

U.S. PATENT DOCUMENTS 5,818,818 A * 10/1998 Soumiya et al. ............ 370/252

5,909,428 A    6/1999  Saito et al.
5,999,533 A   12/1999  Peres et al.
6,021,135 A    2/2000  Ishihara et al.

FOREIGN PATENT DOCUMENTS

| | | |
|---|---|---|
| EP | 0 766 425 A2 * | 2/2007 |
| JP | 3-58646 | 3/1991 |
| JP | 5-336152 | 12/1993 |
| JP | 5-336159 | 12/1993 |
| JP | 7-123101 | 5/1995 |
| JP | 7-162437 | 6/1995 |
| JP | 7-202895 | 8/1995 |
| JP | 8-251655 | 9/1996 |
| WO | WO96/34478 | 10/1996 |
| WO | 96/37081 | 11/1996 |

OTHER PUBLICATIONS

European Examination Report dated Apr. 26, 2005.
Umehira, et al. "ATM Wireless Access for Mobile Multimedia: Concept and Architecture", IEEE Personal Communication: Oct. 1996, XP000635699, pp. 39-48.

* cited by examiner

*Primary Examiner*—Brenda Pham
(74) *Attorney, Agent, or Firm*—Katten Muchin Rosenman LLP

(57) ABSTRACT

A short cell multiplexer includes a sequence designating unit, in which reading intervals corresponding to QOS classes are set in respective reading interval setting registers. A counter memory is stored with the number of timings at which the short cells can be read. The sequence designating unit specifies the QOS class in which the number of timings reaches the reading interval on the basis of the reading interval and the number of timings, and gives to a reading unit an indication of reading the short cell belonging to this class.

3 Claims, 18 Drawing Sheets

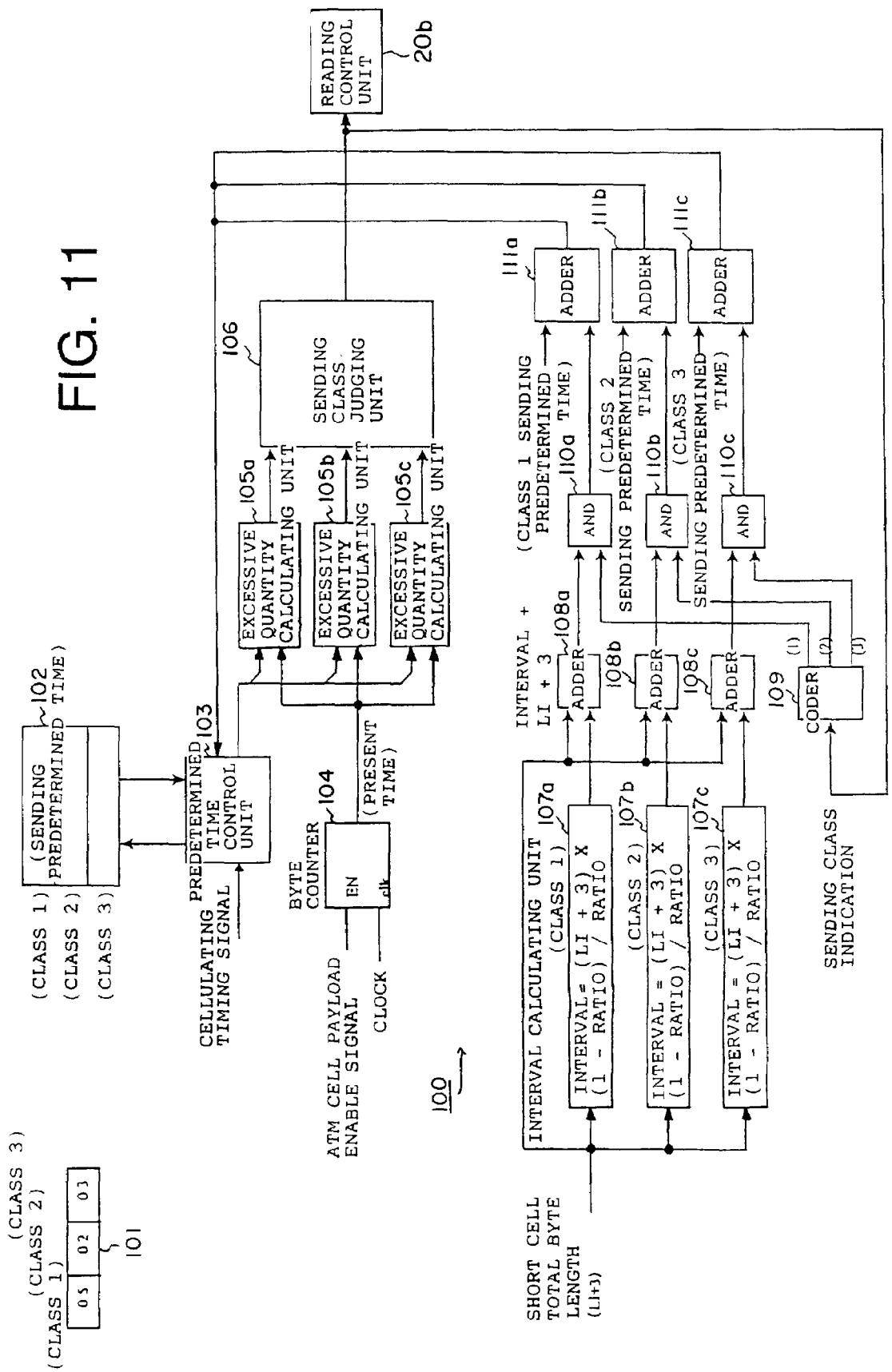

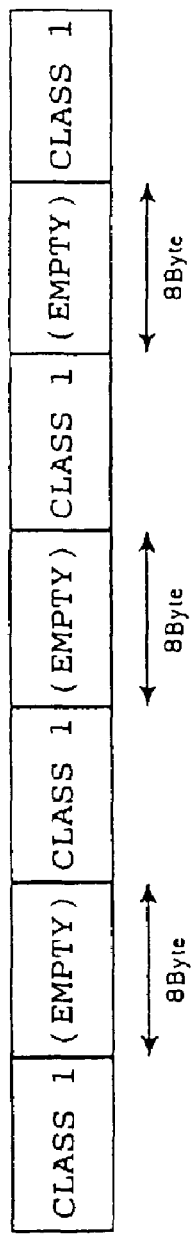
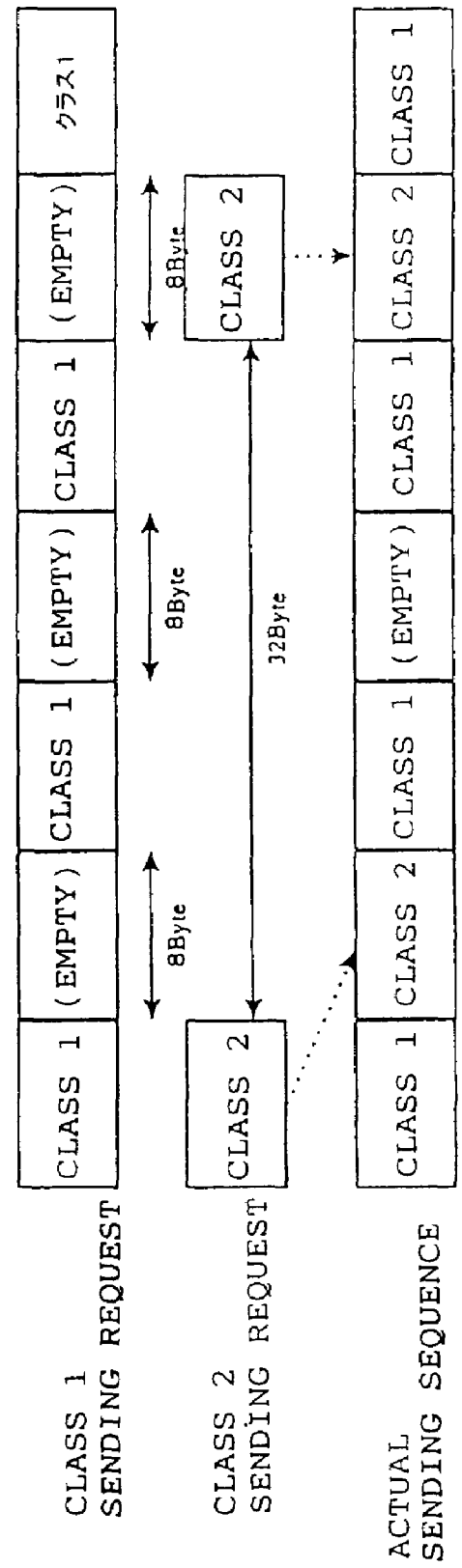
FIG. 12(A)
FIG. 12(B)

SHORT CELL MULTIPLEXER

CROSS REFERENCE TO RELATED APPLICATION

This application is a continuation of Application No. 09/040,043, filed on Mar. 17, 1998.

BACKGROUND OF THE INVENTION

The present invention relates to a multiplexer for multiplexing a plurality of short cells containing low-bit rate information on an ATM connection in communications involving the use of an ATM (Asynchronous Transfer Mode) network.

Generally, communications using an ATM network are carried out by transmitting ATM cells from a transmitting station to a receiving station. The ATM cell consists of a 5-byte header and a payload defined as a 48-byte fixed length data storage area. The payload is stored with user data. The ATM cell is, when transmitted within the ATM network, allocated with one destination (VPI/VCI: Virtual Path Identifier/Virtual Channel Identifier) per connection. Therefore, the header of one ATM cell is stored with information about only one connection.

Incidentally, in the field of mobile communications utilizing a radio system, the information to be transmitted is embedded (cell assembled) in a compression-coded status in the payload of the ATM cell in order to effectively utilize communication bands. The compression-coded information is several bps to several tens of bps, and has an extremely lower bit rate than a transmission speed of the ATM cell. The low-bit rate information takes a relatively long time till it occurs (arrives). Hence, pieces of compression-coded information sequentially occurred are stored directly in the payload of the ATM cell, and, when the payload becomes full of the compression-coded information, the ATM cell is transmitted to the ATM network. If this method is taken, a cellulating process is delayed, i.e., the data transmission is delayed. This delay of data transmission is undesirable because of causing a decline in quality of the communications.

Thus being the case, a transmission method capable of restraining the delay of data transmission due to the delay of the cellulating process and effectively utilizing the transmission bands, is examined in an ATM forum and ITU-T etc. As one of the transmission methods under the examination, there is proposed a method by which the payload of the ATM cell is stored with a plurality of variable-length short cells having a short data length.

FIG. 15 is a conceptual diagram showing a process of multiplexing the short cell in the payload of the ATM cell. Referring to FIG. 15, a short cell 1 consists of a short cell header 2 and a short cell payload 3. The short cell header 2 contains a CID (short cell connection identifier) for identifying a connection of the short cell, and a length indicator (LI) for indicating a payload length of the short cell.

Then, as shown in FIG. 15, the plurality of short cells 1 are multiplexed in the payload 7 of the ATM cell 5 and then transmitted. At this time, one short cell 1 is mapped extending in two ATM cells 5 (which is called an overlap), depending on a position where the short cell 1 is embedded in the payload 7.

Thus, if the plurality of short cells 1 are multiplexed within the ATM cell 5 transmitted on the same connection, a time for which the payload 7 of the ATM cell 5 becomes full of the data can be reduced by the CID attached to each short cell, and hence the delay of the cellulating process, i.e., the delay of data transmission can be restrained.

By the way, there is a CLAD (Cell Assembly and Disassembly) as a technique for storing the payload of the ATM cell 5 with data given from one information source. FIG. 16 is a diagram showing a structure of the CLAD. Referring to FIG. 16, a CLAD 8 is constructed of a data storage buffer 9, a data quantity monitoring unit 10, a reading control unit 11, and an ATM cell header generating unit 12.

The data storage buffer 9 accumulates data inputted from an information source. The data quantity monitoring unit 10 monitors whether or not a quantity of the data stored in the data storage buffer 9 exceeds one cell. When the data exceeding one cell are accumulated, the reading control unit 11 is notified of this fact. The reading control unit 11, upon receiving the notification from the data quantity monitoring unit 10, reads the data for one cell from the data storage buffer 9, and supplies the data to the ATM cell header generating unit 12. The ATM cell header generating unit 12 attaches the ATM cell header 6 to the one-cell data (embedded in the payload 7) read from the data storage buffer 9, thereby generating the ATM cell 5. Then, the thus generated ATM cell 5 is transmitted to the ATM network 13.

The above-described CLAD 8 is, however, structured on the premise that the data stored in the payload 7 of the ATM cell 5 be transmitted on the same connection. Therefore, in the case of the multiplexing the above short cells 1 by use of the CLAD 8, the respective short cells 1 are required to have the same connection information (which are required to be transmitted on the same connection). Accordingly, it was impossible to multiplex the plurality of short cell 1 having different connection data.

Obviation of this problem entails the short cell multiplexer in which the plurality of short cells 1 having the different connection data are multiplexed and stored in the payload 7 of the ATM cell 5, and this ATM cell is transmitted on the same connection.

Herein, for example, the above short cell multiplexer can be actualized by providing buffers corresponding to QOS classes classified according to QOS conditions containing connection statuses (types), designating a reading band for each QOS class, designating a sequence of the buffers-for reading the short cells in accordance with the above designation, reading the short cells 1 one by one from the designated buffer, and multiplexing the short cells.

FIG. 17 is a conceptual diagram illustrating the short cell multiplexer having the construction described above. Referring to FIG. 17, the short cell multiplexer is constructed of an identifying unit 16, a writing unit 17, a storage unit 18, a reading unit 19, and a reading sequence control unit 20. The short cell arriving is inputted to the identifying unit 16.

The identifying unit 16 confirms a process of identifying the connection (such as confirming whether or not the connection is set an, if there is, e.g., "no setting", disposing of the relevant short cell 1 and so on) on the basis of the CID stored in the short cell header 2 of the short cell 1 inputted to the identifying unit 16 itself. Further, on the basis of the CID of the short cell 1, the identifying unit 16 executes a process of identifying which QOS class the short cell 1 belongs to.

The storage unit 18 is constructed of a plurality of FIFOs (First-In First-Out) 22 (22a-22n). Each of the FIFOs 22a-22n constitutes a storage area of the short cell 1, which correspond to the above-described QOS class. Each of the FIFOs 22a-22n is stored with the short cell 1 having the same CID on the basis of a result of the identification by the identifying unit 16.

The writing unit 17 receives the short cell 1 from the identifying unit 16 via a signal line 16*a*, and also receives the result of the identification (e.g., a QOS class number of the short cell 1 arriving at the identifying unit 16) by the identifying unit 16 via a signal line 16*b*. Thereupon, the writing unit 17 switches over its own output in accordance with the QOS class number. The short cell 1 transmitted from the identifying unit 16 is stored in the FIFO 22 of the relevant QOS class by the writing unit 17.

The reading sequence control unit 20 supplies the reading unit 19 with a sequence of reading the short cells 1 stored in the FIFOs 22*a*-22*n* in accordance with a predetermined algorithm. for instance, the reading sequence control unit 20 gives to the reading unit 19 an indication of designating the QOS class of the short cells 1 in accordance with the reading sequence corresponding to a sending band preset per QOS class.

The reading unit 19, upon receiving the indication of designating the QOS class from the reading sequence control unit 20, switches over its own output. The short cell 1 is thereby read from any one of the FIFOs 22*a*-22*n*, which corresponds to the designating indication. At this time, the reading sequence control unit 20 judges whether or not the payload 7 is full of the short cells read therefrom. If not full of the short cells 1, the reading sequence control unit 20 again gives to the reading unit 19 the QOS class designating indication.

Thus, the reading sequence control unit 20 gives to the reading unit 19 the QOS class designating indication till it is judged that the payload 7 becomes full of the short cells 1. The short cells 1 are thereby sequentially read from the FIFOs 22*a*-22*n* and transmitted to the ATM cell header generating unit 12.

The ATM cell header generating unit 12 attaches the ATM cell headers 6 to the plurality of short cells 1 read by the reading unit 19. The ATM cell 5 including the payload 7 in which the multiplexed short cells 1, is thereby structured and transmitted on the same connection.

Herein, there is such a contrivance that a sequence pattern (a QOS class designating sequence pattern) of reading the short cells 1 from the FIFOs 22*a*-22*n*, is set as an algorithm for designating the sequence of reading the short cells 1 stored in the FIFOs 22*a*-22*n*, and the reading sequence control unit 20 designates the QOS class of the short cell 1 in accordance with this sequence pattern.

FIG. 18 is a conceptual diagram showing the sequence designation control by the reading sequence control unit 20. According to the present method, a storage device (such as, e.g., a memory and a register) 200 possessed by the reading sequence control unit 20 is made to store the reading sequence pattern wherein the QOS class numbers are arranged in a sequence in which to read them. FIG. 18, however, shows an example in which the number of the QOS classes shown in FIG. 17 is given by n=3.

In the example shown in FIG. 18, the storage device 200 is formed with ten setting areas stored with class number each indicating any one of three QOS classes (a class 1, a class 2 and a class 3). Further, a ratio between the QOS classes is set, e.g., such as:

Class 1:Class 2:Class 3=5:4:1

Then, the class numbers stored in the respective setting areas are arranged from the left side toward the right side on the sheet of FIG. 18 in accordance with the reading sequence. With this arrangement, the reading sequence control unit 20 shown in FIG. 17 repeatedly gives to the short cell reading unit 19 the QOS class designating indication (the indication of reading the short cells 1) in a sequence such as "1→2→1→2→1→2→3→1→2→1" with respect to one cycle. Then, the short cell reading unit 19 reads the short cells 1 from the FIFOs 22*a*, 22*b* and 22*c* (FIFO 22*n*) in accordance with the above sequence pattern.

There is, however, a problem inherent in the method shown in FIG. 18. Namely,according to the method shown in FIG. 18, it is predetermined how broad the reading band is set per QOS class, and the band is determined depending on how many times the QOS class number is designated in the above-described reading sequence pattern. In the example shown in FIG. 18, if a reading speed is set to 10 Mbps on the whole, the class 1 is designated five times during one cycle of the memory for designating the reading sequence, and hence the reading band of, e.g., the class 1 is given by 10 Mbps×5/10=5 Mbps. Accordingly, for minutely controlling the reading band, it is required that the number of designations in the reading sequence pattern be set as large as possible. This setting involves the use of a memory area of a large capacity, and consequently there arises a problem of causing a rise in the costs for the hardware.

Further, the number of QOS classes designated during one cycle of the reading sequence pattern is conditioned by an accuracy of the reading band. According to the method shown in FIG. 18, the QOS class is designated ten times during one cycle of the reading sequence pattern. Therefore, a reading speed of the short cell 1 (the short cell of the class 3 in the example) read only once during one cycle becomes a minimum bit rate. That is, in the example shown in FIG. 18, the minimum bit rate is 1 Mbps, and a minimum bit rate lower than 1 Mbps can not be set. Moreover, according to the method exemplified in FIG. 18, there is no alternative but to set the bit rate on the unit of only 1 Mbps.

Furthermore, there might be a case of requiring a change in the band for reading the short cell 1 in accordance with an increase or decrease in the number of connections of the short cells 1. According to the method shown in FIG. 18, however, the process of changing the reading band needs resetting the sequence of the QOS class number and the number of QOS class numbers in the reading sequence pattern. It is therefore extremely difficult to execute the process of changing the setting of the reading band.

SUMMARY OF THE INVENTION

It is a primary object of the present invention, which was contrived in view of the problems described above, to provide a short cell multiplexer capable of restraining a rise in costs for the hardware, and easily executing a process of changing a reading band.

The present invention adopts the following constructions in order to obviate the above-described problems. Namely, according to a first aspect of the present invention, a short cell multiplexer comprises a storing unit for storing a plurality of short cells belonging to any one of a plurality of classes, a sequence designating unit for designating a sequence of reading the plurality of short cells stored in the storing unit, a reading unit for reading the plurality of short cells from the storing unit in accordance with the sequence designated by the sequence designating unit, and a multiplexing unit for multiplexing the plurality of short cells read from the storing unit. The sequence designating unit includes a reading interval retaining unit for retaining a reading interval value per class when reading two short cells belonging to the same class at a time interval, a counting unit for counting up the number of timings at which the short cells are read by the reading unit, and a class designating unit for giving to the reading unit a reading indication of the short cell belonging to the class in which the number of timings counted up by the counting unit reaches the reading interval value.

According to the first aspect of the present invention, the counting unit counts up the number of timings at which the short cells can be read by the reading unit. The class designating unit compares the number of timings with the reading interval stored in the reading interval retaining unit, and gives to the reading unit the indication of reading the short cells belonging to the class in which the number of timings reaches the reading interval value. The reading unit thereby reads the short cells belong to the relevant class from the storing unit. hence, there is no necessity for an area for storing the reading sequence pattern of the short cells. Accordingly, a storage device (a hardware resource) of the short cell multiplexer can be effectively used, whereby the costs can be reduced.

According to the first aspect of the invention, it is desirable that the class designating unit be constructed to, if the plurality of classes having the number of timings that reaches the reading interval value substantially simultaneously occur, specify one class among the plurality of classes in accordance with a predetermined priority, and give to the reading unit an indication of reading the short cells belonging to the specified class.

According to a second aspect of the present invention, a short cell multiplexer comprises a storing unit for storing a plurality of short cells belonging to any one of a plurality of classes, a sequence designating unit for designating a sequence of reading the plurality of short cells stored in the storing unit, a reading unit for reading the plurality of short cells from the storing unit in accordance with the sequence designated by the sequence designating unit, and a multiplexing unit for multiplexing the plurality of short cells read from the storing unit. The sequence designating unit includes a credit retaining unit for retaining, per class, a credit value defined as the number of bytes, for designating one class among the plurality of classes, a subtracting unit for subtracting, when the short cell is read by the reading unit, the number of bytes of the relevant short cell from the credit value of the class to which the short cell belongs, and a class designating unit for giving to the reading unit an indication of reading the short cells belonging to the class having the maximum credit value retained by the credit retaining unit.

According to the second aspect of the present invention, when the reading unit reads the short cell, the number of bytes of the relevant short cell is subtracted from the credit value corresponding to the class to which the read short cell belongs. Thereafter, the class designating unit gives to the reading unit the indication of reading the short cell belonging to the class having the maximum credit value.

Thus, according to the second aspect, unlike the first aspect, there is designated the class which the short cell belonging to should be read without setting the reading interval. Therefore, it never happens that a preset length (the number of bytes) of the short cell to is determined. Accordingly, the number of bytes of the actually read short cell exceeds the preset length (the number of bytes) of the short cell, and hence it is feasible to prevent an occurrence of delay in a standby status for reading the short cells of other classes.

According to the second aspect of the invention, it is desirable that the credit retaining unit be constructed to hold, per class, a credit set value defined as an initial value of the credit value when the reading sequence designation by the sequence designating unit is started.

Further, according to the second aspect of the invention, it is desirable that the sequence designating unit be constructed to further include an adding unit for adding, when all the credit values retained by the credit retaining unit are under a predetermined threshold value, a credit set value of the class corresponding to each credit value, to each of the credit values retained by the credit retaining unit.

Furthermore, according to the second aspect of the invention, it is desirable that the sequence designating unit is constructed to specify, when the plurality of classes having the maximum credit value occur substantially simultaneously, one class among the plurality of classes in accordance with a predetermined priority, and give to the reading unit an indication of reading the short cells belonging to the specified class.

According to a third aspect of the present invention, a short cell multiplexer comprises a storing unit for storing a plurality of short cells belonging to any one of a plurality of classes, a sequence designating unit for designating a sequence of reading the plurality of short cells stored in the storing unit, a reading unit for reading the plurality of short cells from the storing unit in accordance with the sequence designated by the sequence designating unit, and a multiplexing unit for multiplexing the plurality of short cells read from the storing unit. The sequence designating unit includes a credit retaining unit for retaining, per class, a credit value defined as the number of bytes, for designating one class among the plurality of classes, a subtracting unit for subtracting, when the short cell is read by the reading unit, the number of bytes of the relevant short cell from the credit value of the class to which the short cell belongs, a class-of-last-time information storing unit for storing class-of-last-time information indicating a class-of-last-time defined as a class to which the short cell read last time by the reading unit belongs, a judging unit for judging whether or not each credit value retained by the credit retaining unit is over a predetermined threshold value, and a class selecting unit for selecting one class among the plurality of classes on the basis of the class-of-last-time information and a result of the judgement by the judging unit, and giving to the reading unit an indication of reading the short cell belonging to the selected class.

According to the third aspect of the invention, it is desirable that the class selecting unit be constructed to, if two or more credit values among the plurality of credit values retained by the credit retaining unit are over the predetermined threshold value, and if the class-of-last-time is contained in the classes corresponding to the two or more credit values, select one class among the classes excluding the class-of-last-time, which correspond to the two or more credit values. With this construction, the short cells belonging to the single QOS class are consecutively read, thereby making it possible to prevent an occurrence of delay in the process of reading the short cells belonging to other QOS classes.

According to the second and third aspect of the invention, if constructed so that the predetermined threshold value becomes zero, this is preferable in terms of facilitating the calculation needed for a process of determining the class by the sequence designating unit.

According to the third aspect of the invention, it is preferable that the class selecting unit be constructed to, if there are the plurality of classes having a credit value over the predetermined threshold value and excluding the class-of-last-time, specify one class among the plurality of classes in accordance with a predetermined priority, and give to the reading unit an indication of reading the short cell belonging to the specified class.

According to a fourth aspect of the present invention, a short cell multiplexer comprises a storing unit for storing a plurality of short cells belonging to any one of a plurality of classes, a sequence designating unit for designating a sequence of reading the plurality of short cells stored in the storing unit, a reading unit for sequentially reading the plurality of short cells from the storing unit in accordance with the sequence designated by the sequence designating unit, and a multiplexing unit for multiplexing the plurality of short cells read from the storing unit. The sequence designating unit includes a calculating unit for calculating, on the unit of bytes per class, a ratio of a band allocated to each class and, on the basis of a length of the short cell read from the storing unit, a predetermined time at which this short cell and the short cell belonging to the same class are read next, and a class designating unit for comparing each predetermined time calculated by the calculating unit with a preset time, and giving to the reading unit an indication of reading the short cell belonging to the class in which the present time reaches the predetermined time.

According to the fourth aspect of the invention, the calculating unit calculates the predetermined time, and the class designating unit gives to the reading unit the indication of reading the short cell belonging to the class in which the present time reaches the predetermined time. Therefore, the band set to the relevant class can be retained without depending on the number of bytes of the short cell stored in the storing unit, and the short cells belonging to the respective classes can be evenly read.

According to the fourth aspect of the invention, it is preferable that the class designating unit be constructed to, if the plurality of classes in which the present time exceeds the predetermined time substantially simultaneously occur, specify one class among the plurality of classes in accordance with a predetermined priority, and give to the reading unit an indication of reading the short cell belonging to the specified class.

Further, according to the fourth aspect of the invention, it is preferable that the class designating unit be constructed to, if there are the plurality of classes in which the same predetermined time is set, specify one class among the plurality of classes in accordance with a predetermined priority, and give to the reading unit an indication of reading the short cell belonging to the specified class.

Further, according to the fourth aspect of the invention, it is preferable that the class designating unit be constructed to, if the plurality of classes in which the present time exceeds the predetermined time substantially simultaneously occur, specifies one class with longest overtime among the plurality of classes, and gives to the reading unit an indication of reading the short cell belonging to the specified class.

BRIEF DESCRIPTION OF THE DRAWINGS

Other objects and advantages of the present invention will become apparent during the following discussion in conjunction with the accompanying drawings, in which:

FIG. 11 is an diagram illustrating a construction of the sequence designation control unit in an embodiment 4;

FIG. 12 is an explanatory diagram showing the designation control by the sequence designation control unit illustrated in FIG. 10;

DESCRIPTION OF THE PREFERRED EMBODIMENTS

Embodiments of the present invention will hereafter be described with reference to the accompanying drawings.

Embodiment 1

To start with, an embodiment 1 of the present invention will be discussed.

[Example of Construction of Network System]

Figure 1:
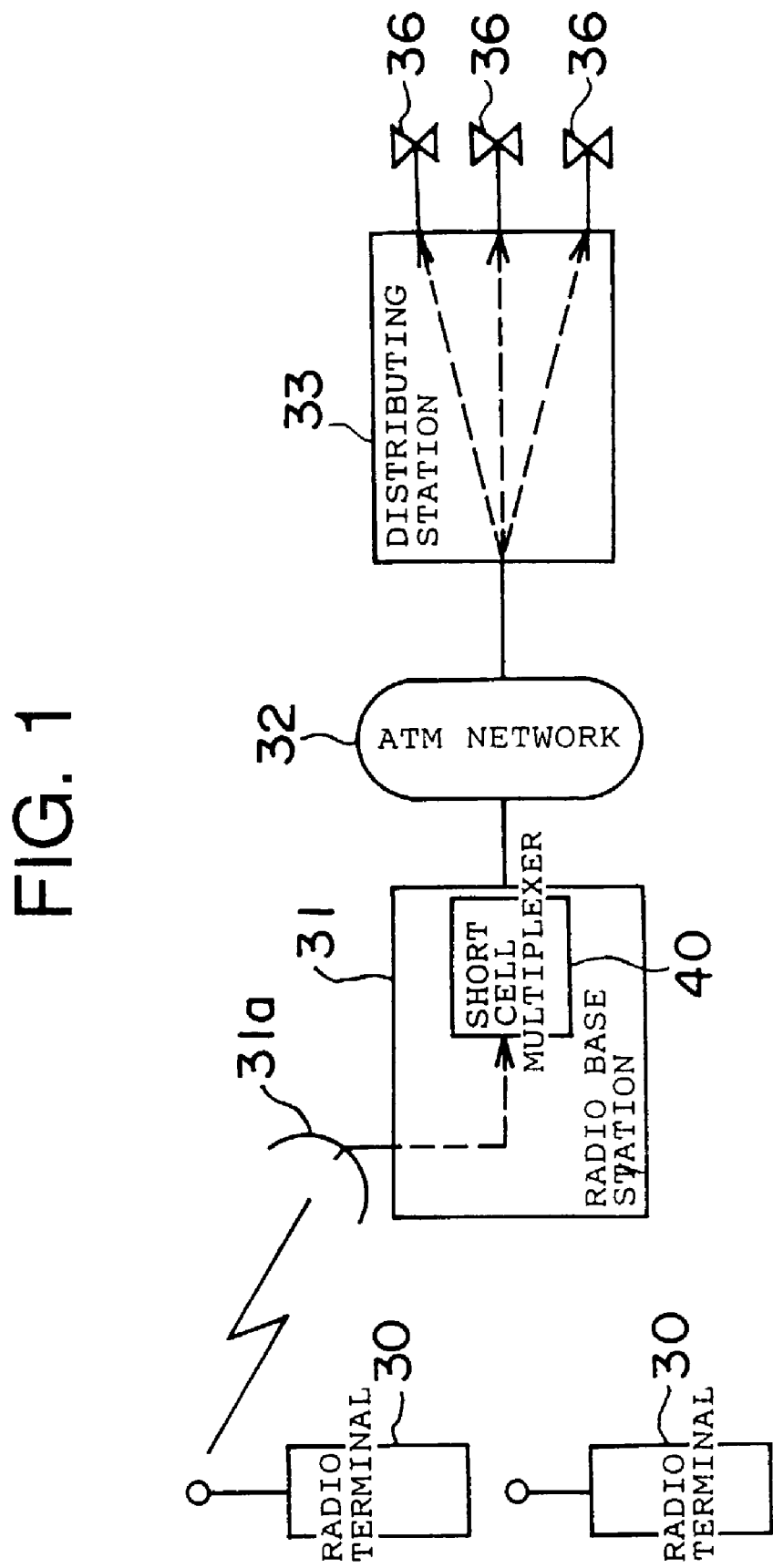
FIG. 1 is a diagram showing an example of a construction of a network system in which a short cell multiplexer according to the present invention is embodied.

FIG. 1 is a view illustrating an example of a construction of a network system in which a short cell multiplexer 40 in accordance with an embodiment 1 is embodied. Referring to FIG. 1, there is shown the network system including a plurality of radio terminal devices 30, a radio base station 31, an ATM network 32 connected to the radio base station 31, a distributing station 33 connected to the ATM network 32, and a plurality of terminal devices 36 connected to the distributing station 33.

Figure 15:
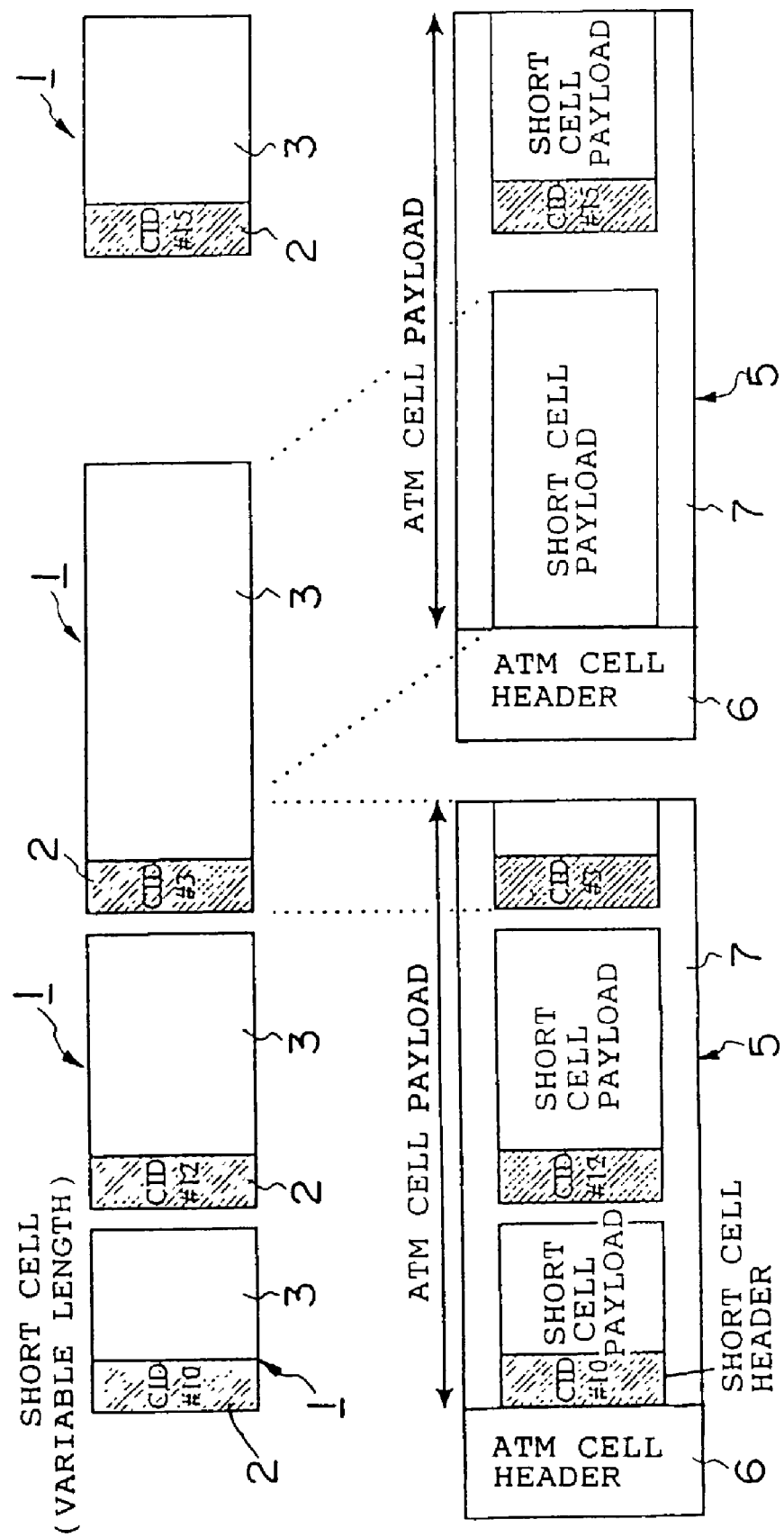
FIG. 15 is an explanatory diagram showing a short cell.
Figure 16:
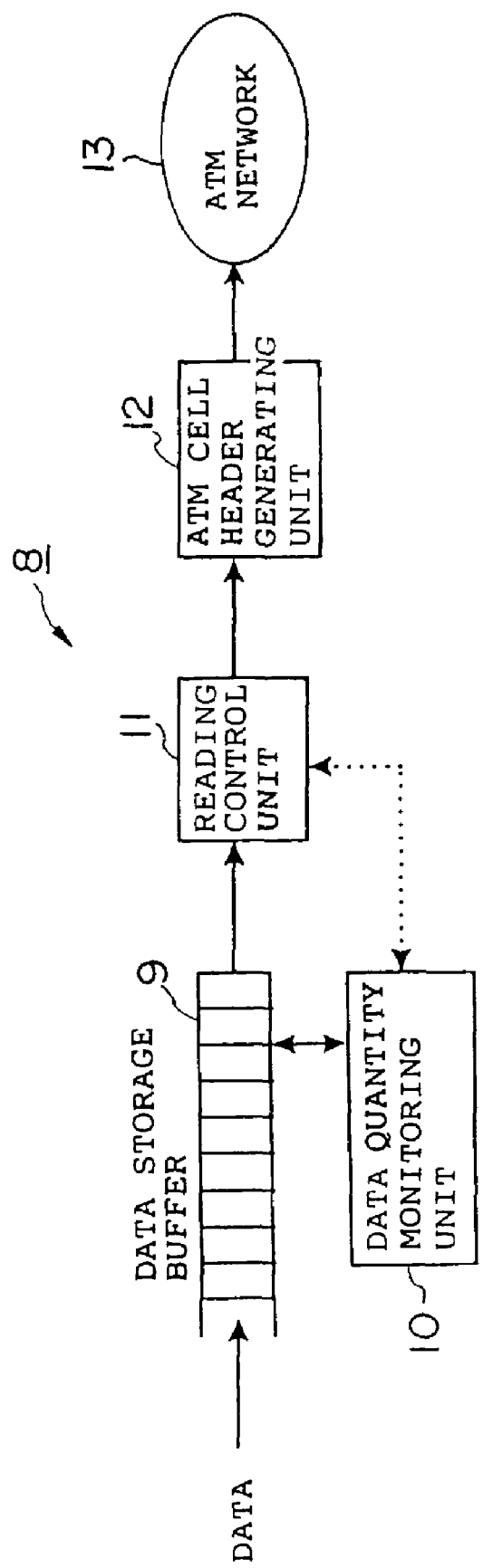
FIG. 16 is a diagram illustrating a structure of a CLAD.
Figure 17:
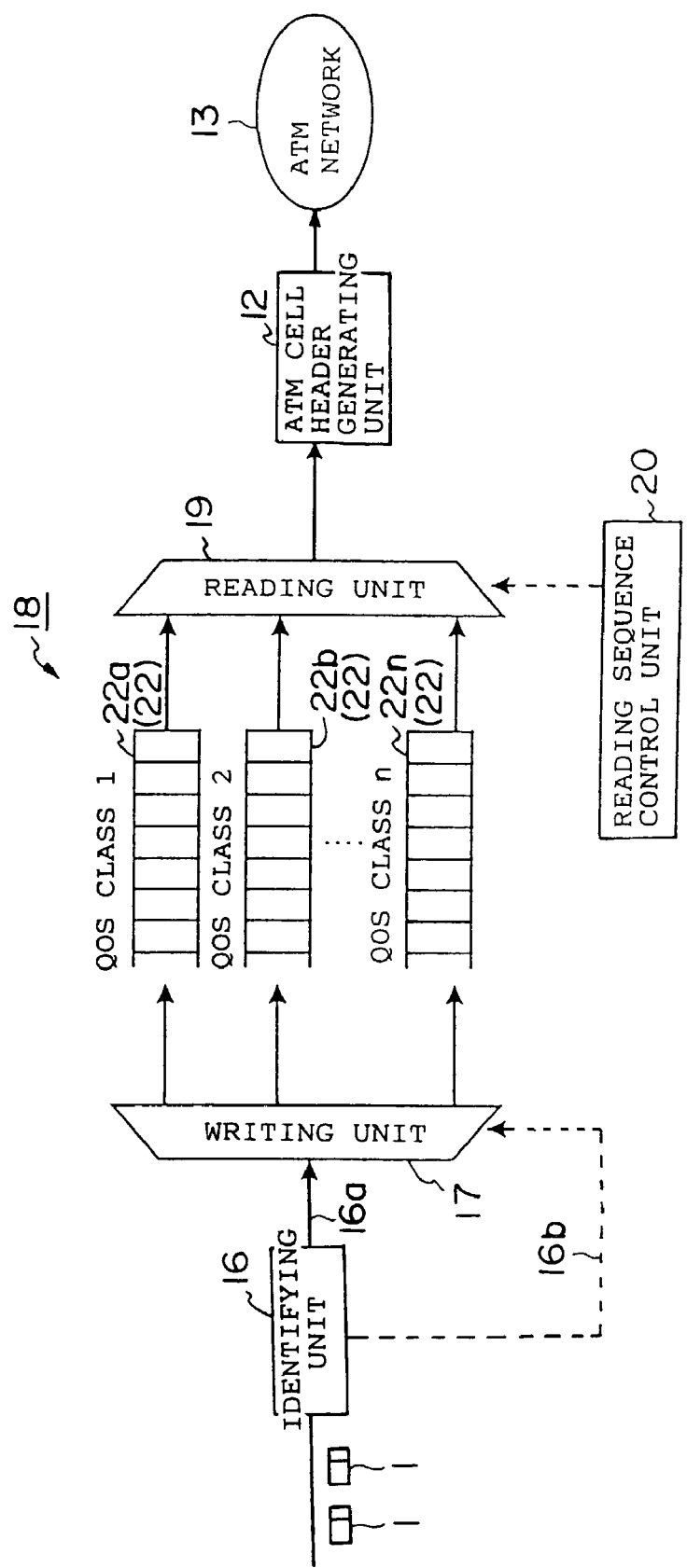
FIG. 17 is a diagram showing a construction of a short cell multiplexer.
Figure 18:
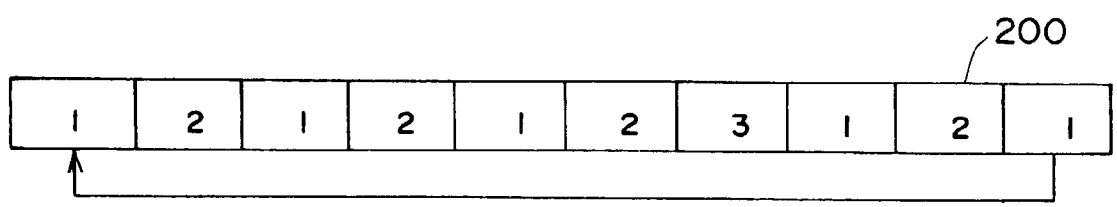
FIG. 18 is an explanatory diagram showing the designation control by a prior art short cell multiplexer.

Each radio terminal device 30 defined as a so-called mobile telephone stores short cell payloads 3 of a plurality of short cells 1 (see FIG. 15) with pieces of voice data and image data etc., and transmits these short cells 1 to the radio base station 31.

The radio base station 31 receives each of the short cells transmitted from the radio terminal device 30 via an antenna 31a. The radio base station 31 has the short cell multiplexer 40 according to the present invention. The short cell multiplexer 40 classifies the plurality of short cells 1 belonging to different connections through which to arrive at the radio base station 31 according to a plurality of quality-of-service classes set corresponding to the connections of the short cells 1, and multiplexes the plurality of classified short cells 1 on a single ATM connection. Namely, a payload 7 of each ATM cell 5 transmitted on the single ATM connection is stored with the plurality of short cells 1. Then, each ATM cell 5 stored with the plurality of short cells 1 is transmitted via the same ATM connection to the distributing station 33 in the ATM network 32.

The distributing station 33 terminates the ATM cell 5 received from the ATM network 32. The distributing station 33 extracts the short cells 1 out of the payload 7 of each ATM cell 5. At this time, the short cell 1 stored extending in the two ATM cells 5 is restructured in an original form. Then, each short cell 1 is transmitted on the connection for the short cell 1 that corresponds to a CID stored in a short cell header 2 thereof, and further transmitted to the terminal device 36 becoming a transmitting destination of the short cell 1.

<ATM Cell and Short Cell>

Figure 2:
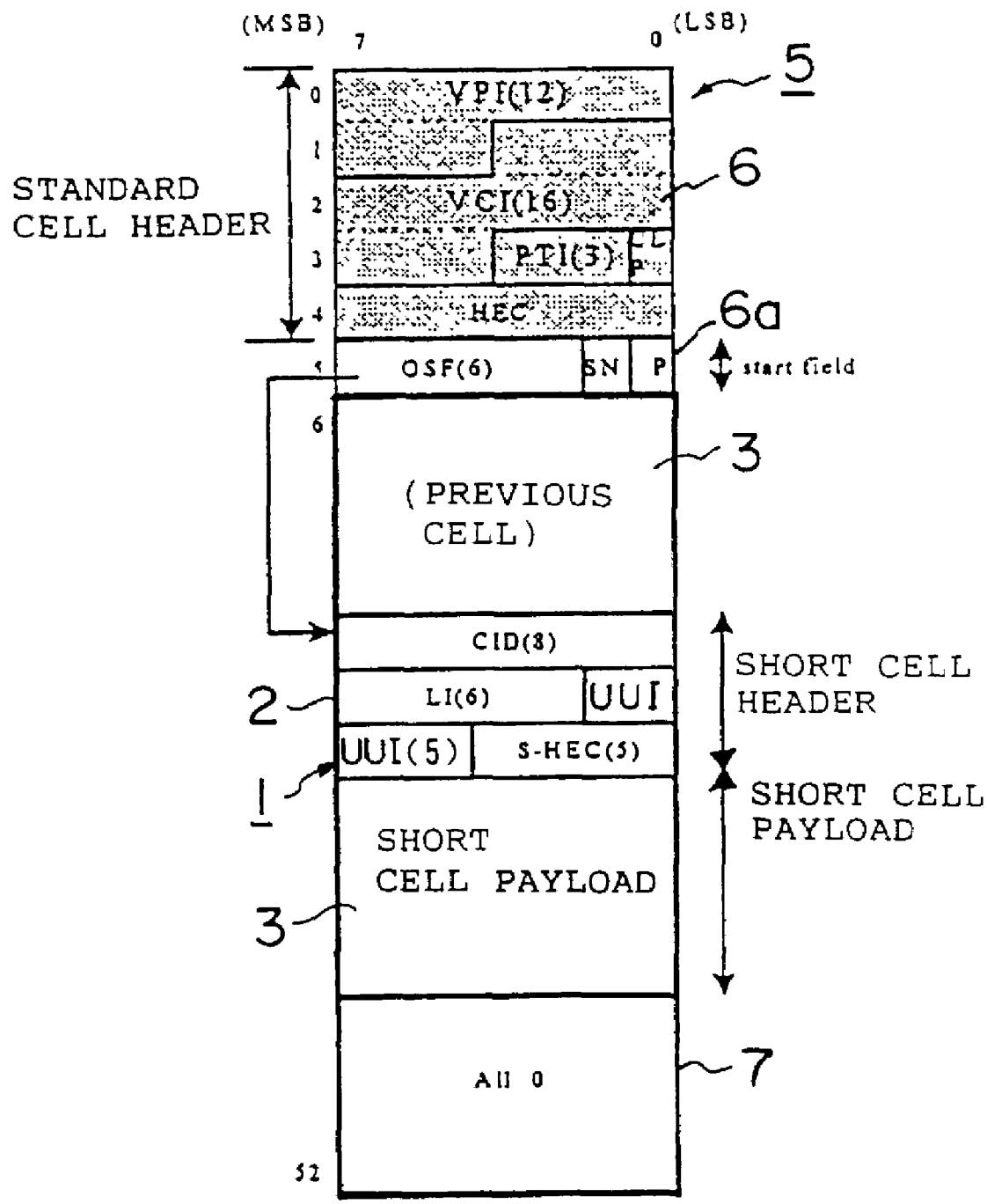
FIG. 2 is an explanatory diagram showing formats of an ATM cell and of a short cell.

Herein, detailed formats of the ATM cell 5 and the short cell 1, which are transmitted within the network shown in FIG. 1, are explained. FIG. 2 is an explanatory diagram showing the formats of the ATM cell 5 and of the short cell 1.

FIG. 2 shows how the multiplexed short cell 1 is stored in the payload 7 of the ATM cell 5. FIG. 2 shows more specifically the short cell 1 a whole of which is stored in the payload 7, and the short cell 1 in which the only the short cell payload 3 is stored in the payload 7 due to an overlap. Note that the format shown in FIG. 2 is a format (an AAL-U multiplex format) pursuant to the recommendation of "B-ISDN ATM ADAPTATION LAYER TYPE 2" (i.363.2) prescribed by the ITU-T. Note that each of the numerals in the brackets indicates the number of bits in FIG. 2.

The ATM cell 5 consists of a 5-byte standard cell header 6, a 1-byte start field 6a, and a 47-byte payload 7. The standard cell header 6 is stored with a VPI/VCI indicating a destination of the ATM cell 5, a PTI showing a payload type, a CLP serving as a cell loss priority indication, and an HEC defined as a header error indication.

The start field 6a, which is a field recommended for storing the payload 7 with the multiplexed short cell 1, is stored with OSF (offset field), SN (1-bit sequence number) and P (parity). Herein, the OSF is a head pointer of the short cell 1 and involves the use of numerals 0 to 47 corresponding to the number of bytes of the payload 7. For example, when the OSF is "0" (OSF=0), this indicates that the short cell 1 is mapped immediately after the start field 6a.

The short cell 1 is constructed of the 3-byte short cell header 2, and the variable length short cell payload 3. The short cell header 2 is stored with an 8-bit CID (short cell connection identifier), a 6-bit LI (short cell payload length indication, a 5-bit UUI (User-to-User Indication), and a 5-bit S-HEC (short cell header error control: this is simply referred to as "HEC" in the I.363.2 recommendations).

Herein, the CID indicates a destination of the short cell 1. Further, the LI is a set of numerals of 0 to 44 showing a byte length of the short cell payload 3. For instance, when LI=0, this indicates that a length of the short cell payload 3 is 1 byte. The short cell payload 3 is defined as a storage area for the user data and stored with the data (e.g., the voice data) generated by, e.g., the radio terminal 30.

<Construction of Short Cell Multiplexer>

Next, a construction of the short cell multiplexer 40 in the embodiment 1 will be explained in detail. In the short cell multiplexer 40 in the embodiment 1, however, three quality-of-service (QOS) classes (a class 1, a class 2 and a class 3) are set corresponding to transmission bands (reading bands) set in accordance with the connections of the short cells 1, and the short cell belonging to each of the QOS classes is multiplexed corresponding to the transmission band. Note that the connection of the short cell 1 corresponding to each QOS class is set in the distributing station 33 shown in FIG. 1.

Figure 3:
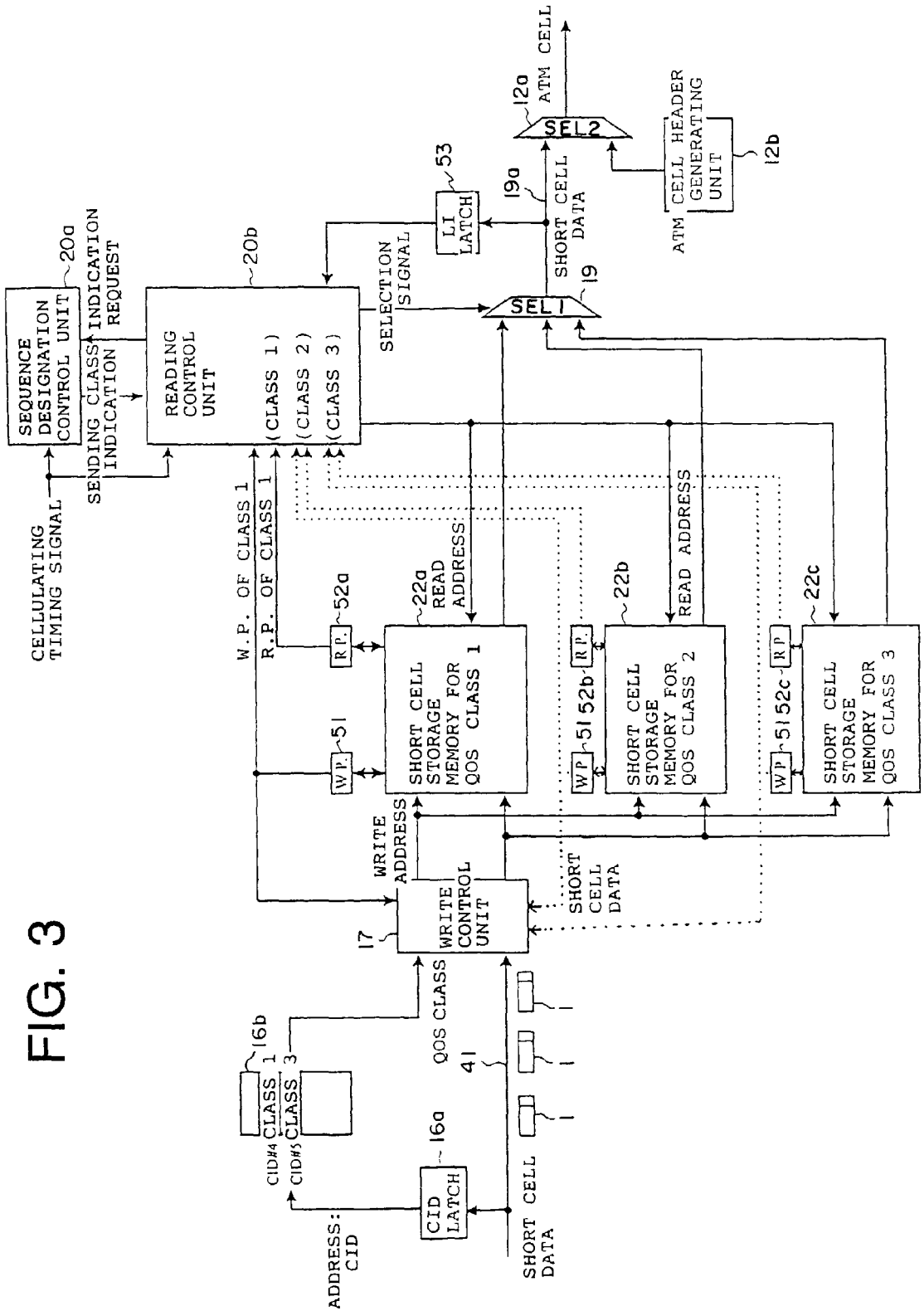
FIG. 3 is a diagram illustrating a whole construction of the short cell multiplexer.

FIG. 3 is a diagram showing the construction of the short cell multiplexer 40 illustrated in FIG. 1. Referring to FIG. 3, a signal line 41 through which the short cell 1 arriving at the radio base station 31 is transmitted, is connected to a write control unit 17 shown in FIG. 1. The write control unit 17 is connected to a short cell storage memory 22 (22a-22c: corresponding to a storage unit of the present invention), and writes the short cell 1 received by the control unit 17 itself to any one of the short cell storage memories 22a-22c.

Further, a write pointer (W.P.) 51 is connected to each of the short cell storage memories 22a-22c. Each write pointer 51 retains a head address (a write point) of a writable area in the short cell storage memory 22 to which the pointer 51 itself is connected. The write control unit 17, when writing the short cell 1 to each of the short cell storage memories 22a-22c, refers to the write point retained by the relevant write pointer 51.

Each of the short cell storage memories 22a-22c is constructed of a FIFO. Each of the short cell storage memories 22a-22c is connected to a first selector 19. The first selector 19 is connected to a second selector 12a via a signal line 19a. The first selector 19 switches over an output of the selector 19 itself, thereby reading the short cell 1 from each of the short cell storage memories 22a-22c and transmitting the short cell 1 to the second selector 12a. The first selector 19 sequentially transmits the plurality of short cells 1 to the second selector 12a, whereby the plurality of short cells 1 are multiplexed on the signal line 19a.

An ATM cell header generating unit 12b is connected to the second selector 12a. The second selector 12a, upon the transmission of the short cell 1 from the first selector 19, receives the standard cell header 6 and the start field 6a (see FIG. 2) from the ATM cell header generating unit 12b. Then, the standard cell header 6, the start field 6a and the short cell 1 are transmitted in this sequence. The ATM cell 5 is thereby generated and transmitted toward the ATM network 32 from the radio base station 31.

Herein, each ATM cell header 6 inputted to the second selector 12a from the ATM cell header generating unit 12b, is stored with the same ATM connection information. Accordingly, the plurality of short cells 1 stored in the short cell storage memories 22a-22c are transmitted from the first selector and thereby multiplexed on the single ATM connection (corresponding to a multiplexing unit of the present invention).

Further, a CID latch 16a is connected to a signal line 41. A QOS class storage memory 16b is connected to this CID latch 16a. Then, the QOS class storage memory 16b is connected to the write control unit 17. The CID latch 16a fetches the CID from the short cell header 2 of the short cell 1 transmitted via the signal line 41 and retains this CID. The QOS storage memory 16b retains the three QOS class numbers corresponding to the CIDs.

With this process, the CID of the short cell 1 arriving at the radio base station is extracted by the CID latch 16a when transmitted via the signal line 41. Thereafter, the short cell 1 is inputted to the write control unit 17. When the CID is retained by the CID latch 16, the QOS class storage memory 16 is accessed with the CID serving as a key, and the QOS class number corresponding to this CID is given to the write control unit 17. Thereupon, the write control unit 17 writes the short cell 1 inputted to the control unit 17 itself via the signal line 41, to any one of the short cell storage memories 22a-22c that corresponds to the QOS class number.

Moreover, a sequence designation control unit 20a (corresponding to a sequence designating unit of the present invention) and a read-out control unit 20b) controls the reading of the short cells 1 out of the short cell storage memories 22a-22c. The sequence designation control unit 20a receives a cellulating timing signal from an unillustrated processor device within the radio base station 31. The cellulating timing signal is, for example, inputted synchronizing with the head of the ATM cell 5 generated in the radio base station 31. The sequence designation control unit 20a, upon receiving the cellulating timing signal, calculates the QOS class of the short cell 1 that should be transmitted from the first selector 19, and gives a result of this calculation as a transmission class indication to the read-out control unit 20b.

Figure 4:
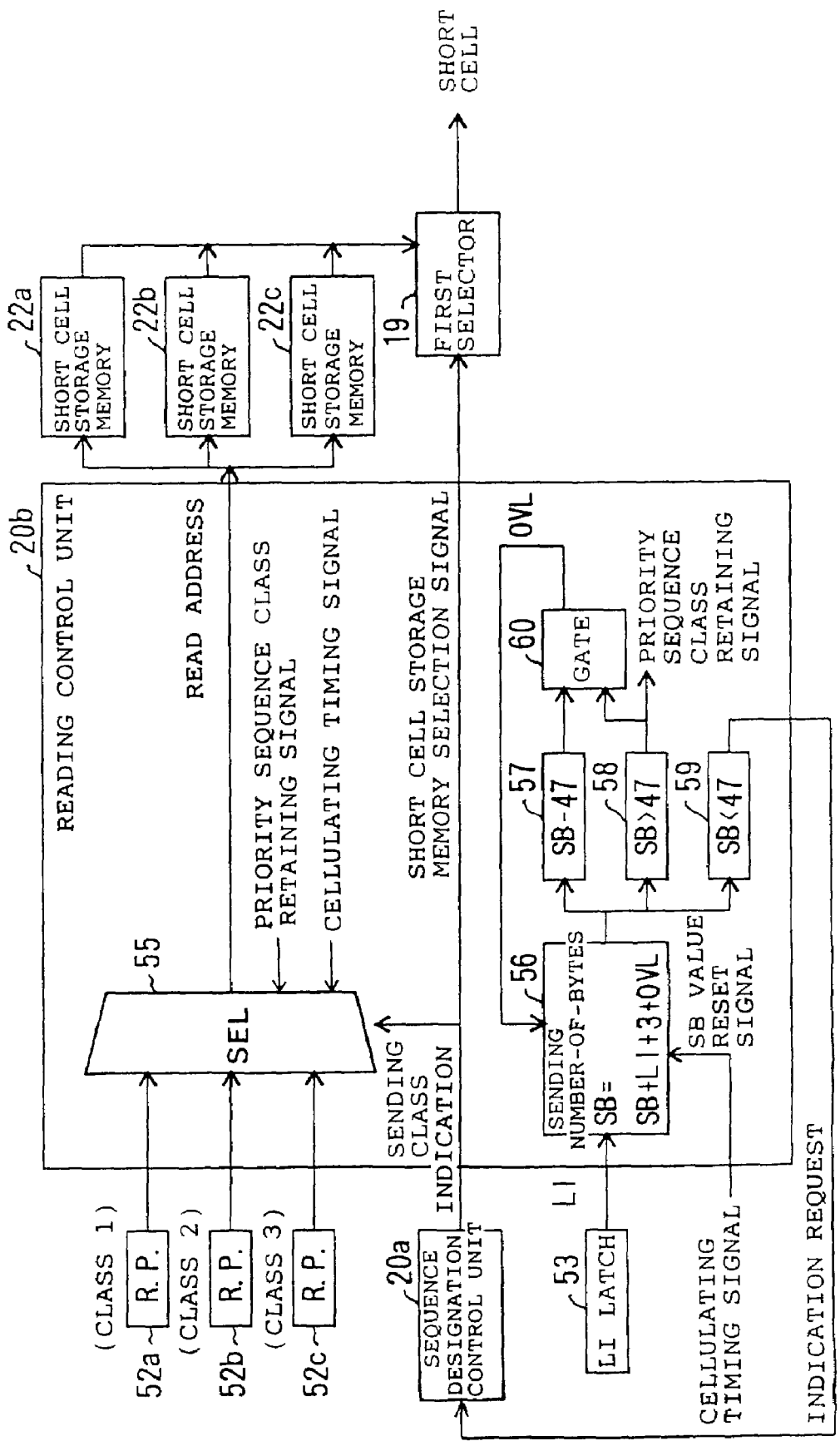
FIG. 4 is a diagram showing a construction of a reading control unit.

The read-out control unit 20b is connected to the short cell storage memories 22a-22c via read pointers (R.P.) 52a-52c. Each of the read pointers 52a-52c retains a head address (a read point) of the short cell 1 which should be read at first from any one, corresponding to the pointer itself, of the short cell storage memories 22a-22c. FIG. 4 shows an example of a construction of the read-out control unit 20b illustrated in FIG. 3.

Referring to FIG. 4, the read-out control unit 20b has a selector 55. Inputted to the selector 55 are the read points from the read pointers 52a-52c and also a transmission class indication from the sequence designation control unit 20a. Thereupon, the selector 55 switches over its own output, thereby giving a read command to the short cell storage memory 22 corresponding to the transmission class indication. Further, the transmission class indication is given, directly to the first selector 19, as a selection signal of the short cell storage memory 22. Then, the short cell 1 is read in accordance with the read point from any relevant memory among the short cell storage memories 22a-22c, and transmitted from the first selector 19 (corresponding to a reading unit of the present invention).

Further, the read-out control unit 20b latches the LI stored in the short cell header 2 of the short cell transmitted from the first selector 19, thereby identifying the number of bytes of the short cell 1 to be read.

Namely, the read-out control unit 20b, if there is left a storable area in the payload 7 of the ATM cell 5 when reading the short cell 1, makes an indication request to the sequence designation control unit 20a. That is, the read-out control unit 20b monitors the number of remaining bytes of the payload 7, and subtracts the number of bytes equivalent to a value of the LI of the read short cell 1 from the number of remaining bytes, thus calculating the number of remaining bytes of the payload 7.

At this time, the read-out control unit 20b, if the number of remaining byes of the payload 7 exceeds "0", gives the indication request to the sequence designation control unit 20a. Thereafter, the reading process of the short cell 1 is executed in accordance with the transmission class indication inputted as a response to the indication request. On the other hand, the read-out control unit 20b, if the number of remaining byes of the payload 7 becomes just "0", executes no special process. By contrast, if the number of remaining bytes of the payload 7 is under "0", the number of bytes corresponds to the number of remaining bytes of the short cell 1 which could not be stored in the payload 7 of the relevant ATM cell 5. Therefore, the read-out control unit 20b, if the number of remaining bytes is under "0", retains the number of remaining bytes and the QOS class number in the process of being transmitted till a next cellulating timing comes. Then, the read-out control unit 20b, when the next cellulating timing signal is inputted, maps a remaining portion of the short cell 1 to the ATM cell 5 generated in accordance with this timing signal.

For executing the above processes, the read-out control unit 20b includes, as illustrated in FIG. 4, a sending number-of-bytes (SB) calculating unit 56, a subtracter 57, a comparator 58, a comparator 59 and a gate 60. The sending number-of-bytes calculating unit 56 is connected via an LI latch 53 to the signal line 19a (see FIG. 3) for connecting the first selector 19 to the second selector 12a. The LI latch 53 fetches the LI from the short cell 1 transmitted from the first selector 19 and retains this LI.

The sending number-of-bytes calculating unit 56 receives a retained content (the LI of the short cell 1) from the LI latch 53, and also receives the cellulating timing signal from the unillustrated processor device in the radio base station 31. Then, the sending number-of-bytes calculating unit 56 obtains a transmission number-of-bytes SB by effecting the following arithmetic operation (Formula 1):

$$SB=SB+LI+3+OVL \qquad \text{(Formula 1)}$$

where on the right side (of the Formula 1), "SB" is a sum of the numbers of bytes that have been sent so far, "3" is the number of bytes of the short cell header 2, and "OVL" is the number of overlap bytes, i.e., the number of bytes of the remaining portion of the short cell 1. The sending number-of-bytes calculating unit 56 imparts the thus calculated SB to the subtracter 57, the comparator 58 and the comparator 59.

The subtracter 57 receives the SB from the sending number-of-bytes calculating unit 56, and calculates such as "SB−47". The value "47" is the number of bytes of the payload 7 of the ATM cell 5. Then, the subtracter 57 gives a result of the calculation to the gate 60.

The comparator 58 receives the SB from the sending number-of-bytes calculating unit 56, and judges whether or not this SB is over "47". At this time, if the SB satisfies the condition (if the SB is over "47"), the comparator 58 assumes that the relevant short cell 1 might be overlapped when mapping this short cell 1 to the payload 7 of the ATM cell 5, and inputs to the selector 55 a signal (a priority QOS class retaining signal) with a purport that the QOS class number which is now in the reading process is retained till a next reading process.

The selector 55, when the priority QOS class retaining signal is inputted thereto, retains a status just when this retaining signal is inputted. Thereafter, the selector 55 reads, when a next cellulating timing signal is inputted to the selector 55 itself, a remaining portion of the short cell 1 from any one of the short cell storage memories 22a-22c corresponding to the relevant retaining signal. The mapping of the short cell 1 to the payload 7 of the next ATM cell 5 is thereby started from a continuation of the short cell 11 overlapped last time.

Further, the priority QOS class retaining signal is supplied also to the gate 60. Thereupon, the ate 60 retains a result of the subtraction by the subtracter 57 as the OVL, and, when a next cellulating timing signal is inputted to the sending number-of-bytes calculating unit 56, inputs this OVL to the sending number-of-bytes calculating unit 56. The sending number-of-bytes calculating unit 56 thereby calculates the SB by use of the inputted OVL.

The comparator 59, upon receiving the SB from the sending number-of-bytes calculating unit 56, judges whether or not this SB is less than "47". At this time, if the SB meets the condition (if the SB is less than "47"), the comparator 59 sends the designation request to the sequence designation control unit 20a on the assumption that the payload 7 of the ATM cell 5 still has an empty area. Thus, the designation request is repeatedly sent till the SB becomes "47" or larger, and each of the read short cells 1 is transmitted from the first selector 19. The payload 7 of the ATM cell 5 is thereby stored with the plurality of multiplexed short cells 1.

Note that the SB value retained so far by the sending number-of-bytes calculating unit 56 is reset when the cellulating timing signal is inputted to the sending number-of-bytes calculating unit 56. At this time, if the gate 60 retains a value of the OVL, the OVL is inputted to the sending number-of-bytes calculating unit 56 after this resetting has be done.

<Construction of Sequence Designation Control Unit>

Figure 5:
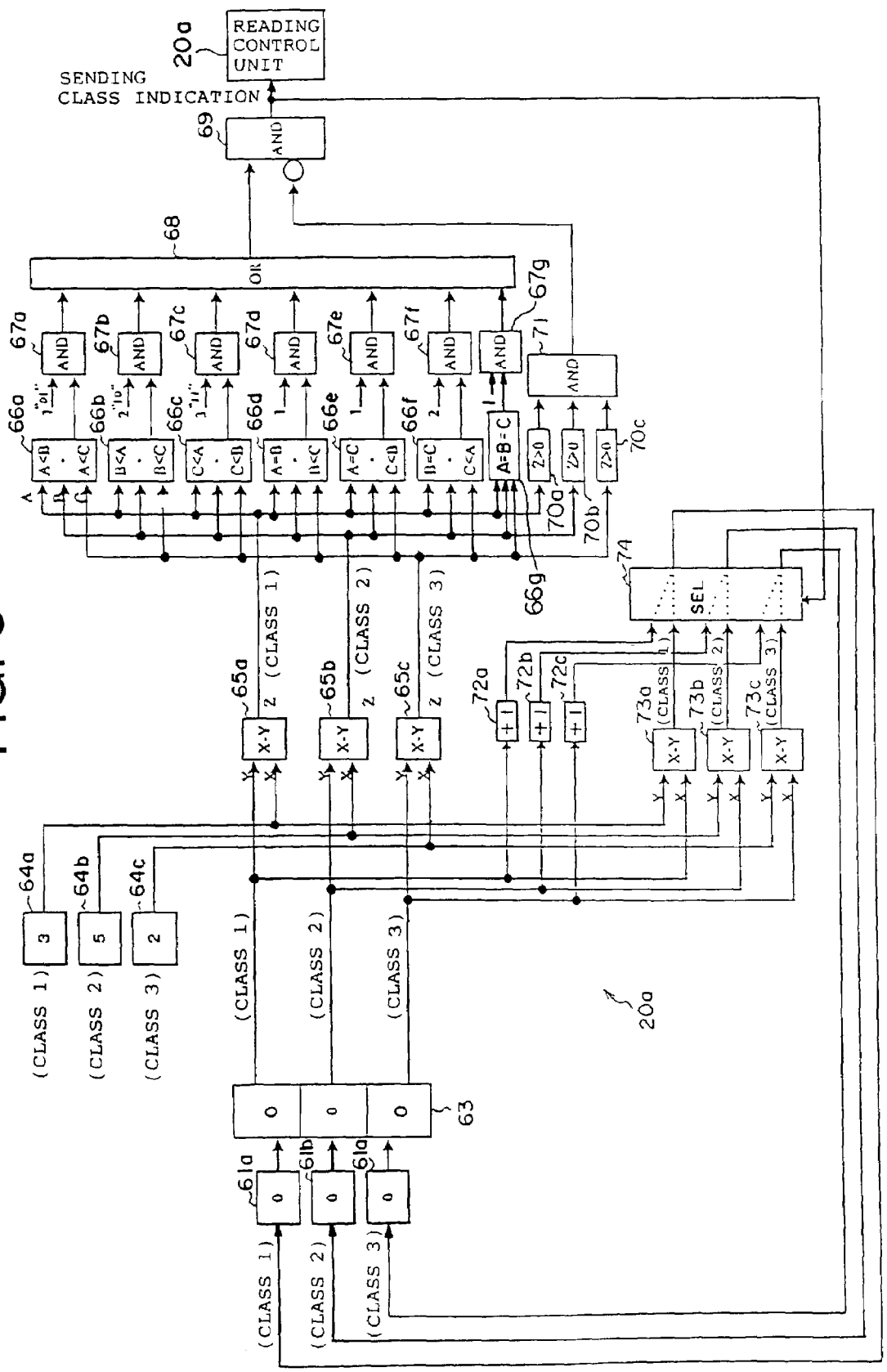
FIG. 5 is a diagram illustrating a construction of a sequence designation control unit in an embodiment 1.

Next, a construction of the sequence designation control unit 20a will be explained. FIG. 5 shows an example of the construction of the sequence designation control unit 20a shown in FIG. 3. The priority of the QOS classes is set in a sequence such as a class 1, a class 2 and a class 3 in the sequence designation control unit 20a illustrated in FIG. 5. Further, a reading interval value of the respective QOS classes is set to "3" for the class 1, "5" for the class 2, and "2" for the class 3. These interval values are stored in reading interval setting registers 64a-64c (corresponding to a reading interval retaining unit of the present invention).

Referring to FIG. 5, a class-1 counter memory 61a, a class-2 counter memory 61b and a class-3 counter memory 61c are connected to subtracters 65a-65c corresponding to these memories themselves through a latch 63 for retaining these counter values. Further, the reading interval setting registers 64a-64c are connected to the subtracters 65a-65c corresponding to these registers themselves.

The counter memories 61a-61c and the reading interval setting registers 64a-64c output their own retained contents every time the cellulating timing signal (see FIG. 3) or the designation request from the read-out control unit 20b is inputted to the sequence designation control unit 20a. Incidentally, the latch 63 may not be provided.

The respective subtracters 65a-65c set, as "Y", output signals from the counter memories 61a-61c corresponding to these subtracters themselves, and set, as "X", output signals from the reading interval setting registers 64a-64c corresponding to the subtracters themselves. The subtracters 65a-65c, upon receiving "X" and "Y", perform a substraction such as "X−Y". Then, the subtracters 65a-65c output a subtracted result as "Z".

Each of the subtracters 65a-65c is connected to any one of comparators 66a-66g corresponding to the subtracter itself. Absolute values of the output signals "Z" from the respective subtracters 65a-65c are inputted as "A", "B", "C" to the respective comparators 66a-66g. Further, the subtracter 65a is connected to a comparator 70a. The output signal "Z" from the subtracter 65a is inputted to the comparator 70a. The subtracter 65b is connected to a comparator 70b. The output signal "Z" from the subtracter 65b is inputted to the comparator 70b. The subtracter 65c is connected to a comparator 70c. The output signal "Z" from the subtracter 65c is inputted to the comparator 70c.

The respective comparators 66a-66g judges whether or not the inputted absolute values "A", "B", "C" satisfy a predetermined condition. For instance, the comparator 66a judges whether or not "A" among "A", "B", "C" is the minimum value. Then, the comparators 66a-66g, if "A", "B", "C" do not satisfy the condition, output a signal of "0", and, whereas if these values meet the condition, outputs a signal of "1".

An output terminal of the comparator 66a is connected to one input terminal of an AND circuit 67a, and an output terminal of the comparator 66b is connected to one input terminal of an AND circuit 67b. Further, an output terminal of the comparator 66c is connected to one input terminal of an AND circuit 67c, and an output terminal of the comparator 66d is connected to one input terminal of an AND circuit 67d. Furthermore, an output terminal of the comparator 66e is connected to one input terminal of an AND circuit 67e, and an output terminal of the comparator 66f is connected to one input terminal of an AND circuit 67f. Further, an output terminal of the comparator 66g is connected to one input terminal of an AND circuit 67g. Then, output terminals of the AND circuits 67a-67g are connected to an input terminal of an OR circuit 68.

The signal "1" (which is in fact a 2-bit signal of "01") indicating the class 1 is inputted to the other input terminals of the AND circuits 67a, 67d, 67e, 67g. Each of the AND circuits 67a, 67d, 67e, 67g, when receiving the signal "1" from any one comparator corresponding to the AND circuit itself among the comparators 66a, 66d, 66e, 66g, inputs the signal "1" indicating the class 1 to the OR circuit 68.

Moreover, the signal "2" (which is in fact a 2-bit signal of "10") indicating the class 2 is inputted to the other input terminals of the AND circuits 67b, 67f. Each of the AND circuits 67b, 67f, when receiving the signal "1" from any one of the comparators 66b, 66f that corresponds to the AND circuit itself, inputs the signal "2" indicating the class 2 to the OR circuit 68.

Furthermore, the signal "3" (which is in fact a 2-bit signal of "11") indicating the class 3 is inputted to the other input terminal of the AND circuits 67c. The AND circuit 67c, when receiving the signal "1" from the comparator 66c, inputs the signal "3" indicating the class 3 to the OR circuit 68.

The OR circuit is connected to one output terminal of an AND circuit 69. The OR circuit, if there is no input from any one of the AND circuits 67a-67g (if the signal "0" is inputted), inputs the signal "0" to the AND circuit 69. On the other hand, the OR circuit 68, when any one of the signals "1", "2", "3" is inputted from any one of the AND circuits 67a-67g, inputs this input signal to the AND circuit 69.

Each of the comparators 70a-70c judges whether or not the value "Z" inputted to the comparator itself is over "0". At this time, each of the comparators 70a-70c, if "Z" is under "0", outputs the signal "0", and, whereas if "Z" is over "0", outputs the signal "1".

An input terminal of an AND circuit 71 is connected to an output terminal of each of the comparators 70a-70c. Further, an output terminal of the AND circuit 71 is connected to the other input terminal of the AND circuit 69. This AND circuit 71, only when the signal "1" is inputted from each of the comparators 70a-70c, outputs the signal "1", and, in cases other than this, outputs the signal "0".

An output signal of the AND circuit 71 is inversely inputted to the other input terminal of the AND circuit 69. Accordingly, in a case where any one of "1", "2", "3" is inputted from the OR circuit 68 to the AND circuit 69, when the signal "0" is outputted from the AND circuit 71, the AND circuit 69 outputs an output (any one of "1", "2", "3") of the OR circuit 68 as sending class indication.

By contrast, the AND circuit 69, when receiving the signal "1" from the AND circuit 71, outputs the signal "0"

even in such a case as to receive any one of the signals "1", "2", "3" from the OR circuit 68. Herein, when the signal "0" is outputted from the AND circuit 69, this implies that there is no QOS class to be designated. Then, the sending class indication outputted from the AND circuit 69 is inputted to the above-mentioned read-out control unit 20a as well as to the selector 74.

Further, any one corresponding adder among adders 72a-72c adds "1" to the counter value stored in each of the counter memories 61a-61c, and the 1-added value is then inputted to the selector 74. Further, each of the subtracters 73a-73c sets, as "X", an input from any one of the counter memories 61a-61c that corresponds to the subtracter itself, and sets as "Y" an output from the any one of the reading interval setting registers 64a-64c that corresponds to the subtracter itself. Each of the subtracters 73a-73c performs a substraction such as "X−Y". Then, each of the subtracters 73a-73c inputs a subtracted result to the selector 74.

The selector 74 receives respective output signals of the adders 72a-72c and the subtracters 73a-73c, and also receives the sending class indication from the AND circuit 69. At this time, when the sending class indication is "0", the selector 74 outputs the output signals of the adders 72a-72c. In contrast with this, when the sending class indication is any one of "1", "2", "3", the selector 74 outputs the output signal of any one of the subtracters 73a-73c (e.g., the subtracter 73a in when the sending class indication is "1"), which corresponds to the sending class indication, and, with respect to other classes, outputs the output signals of the adders 72a-72c not corresponding to the sending class indication. Three signals outputted from this selector 74 form counter memory write data written to the counter memories 61a-61c, and the counter values of the counter memories 61a-61c are updated with values of those pieces of counter memory write data.

Note that the functions of the adders 72a-72c, the subtracters 73a-73c and the selector 74 correspond to the counting unit of the present invention, and the functions of the subtracters 65a-65c, the comparators 66a-66g, the AND circuits 67a-67g, the OR circuit 68, the AND circuit 69, the comparators 70a-70c and the AND circuit 71, correspond to the class designating unit of the present invention.

<Designation Control by Sequence Designation Control Unit>

Figure 6:
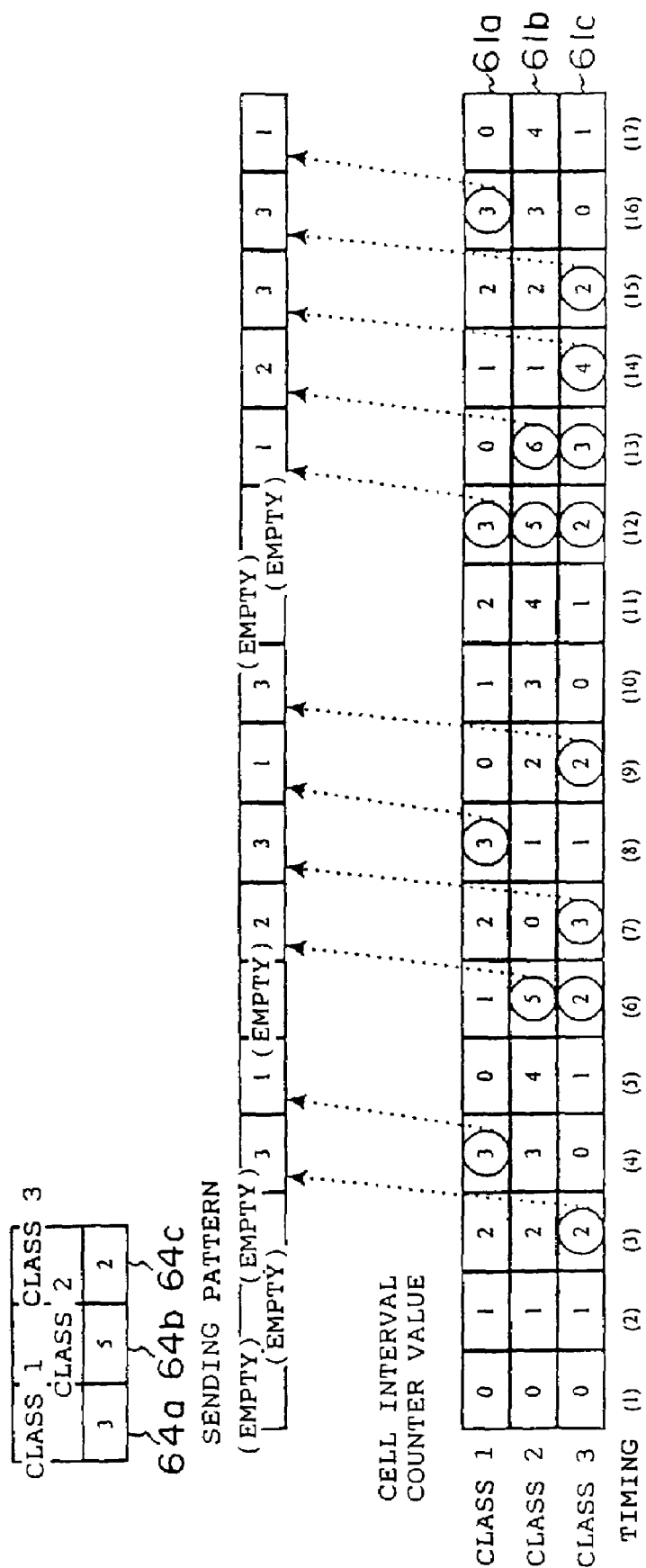
FIG. 6 is an explanatory diagram showing designation control by a sequence designation control unit shown in FIG. 5.

Next, the designation control (a designation method) by the above sequence designation control unit 20a will be explained. FIG. 6 is an explanatory diagram showing the designation control by the sequence designation control unit 20a shown in FIG. 5. As shown in FIG. 6, the reading interval setting registers 64a-64c are stored respectively with, for example, "3", "5", "2" as reading interval values of the classes 1-3. Namely, the class 1 is designated at an interval of "3", the class 2 is designated at an interval of "5", and the class 3 is designated at an interval of "2".

Herein, the reading interval is, when reading the two short cells belonging to the same QOS class, the number of short cells readable between these two short cells (a timing at which the short cells 1 belonging to other classes can be read during a period for which the two short cells 1 belonging to the same class are read). Note that the circled numerals in FIG. 6 indicate counter values exceeding the reading interval value.

Further, it is assumed that the respective counter memories 61a-61c are stored with "0" as an initial value at a timing (1) shown in FIG. 6. In this status, the sequence designation control unit 20a, when the cellulating timing signal is inputted thereto (see FIG. 3), implements a calculating operation of the sending class. To be specific, the sequence designation control unit 20a outputs a sending class indication of the QOS class in which the counter value is equal to or larger than the reading interval value. Then, the sequence designation control unit 20a updates the counter value of the QOS class to which the short cell 1 belonging is read, with a value of a calculated result of "(Present Counter Value—Reading Interval Setting Value)", Hereinbelow, the operation of the sequence designation control unit 20a is concretely explained.

That is, at the timing (1) shown in FIG. 6, a value of "Z" that corresponds to the class 1 is "3", a value of "Z" that corresponds to the class 2 is "5", and a value of "Z" that corresponds to the class 3 is "2". Therefore, an output of the AND circuit 71 becomes "1", and an output of the AND circuit 69 becomes "0", i.e., there is no designation. Hence, the output signals of the adders 72a-72c are outputted from the selector 74, and the counter memories 61a-61c are stored with the values ("1", "1", "1") counted up by "1".

At a timing (2), as in the case of the timing (1), the counter value of any one of the counter memories 61a-61c is smaller than the value of any corresponding one of reading interval setting registers 64a-64c, and hence the output of the AND circuit 69 becomes "0". Then, the counter memories 61a-61c are stored with values ("2", "2", "2") counted up by "1".

At a timing (3), there is a status of having two intervals from the timing (1), and therefore the class 3 is designated. That is, an "A"-value corresponding to the class 1 becomes "1", a "B" value corresponding to the class 2 becomes "3", and a "C" value corresponding to the class 3 becomes "0". Therefore, "1" is outputted from the comparator 66c, and "3" indicting the class 3 is inputted to the AND circuit 69 via the AND circuit 67a and the OR circuit 68.

At this time, since "0" is outputted from the AND circuit 71, "3" defined as a sending class indication of the class 3 is outputted from the AND circuit 69. With this processing, the read-out control unit 20b reads the short cell 1 from the short cell storage memory 22c in accordance with the sending class indication of the class 3.

On the other hand, "3" is inputted from the AND circuit 69, and therefore the selector 74 outputs the respective output signals of the adders 72a, 72b, and outputs the output signal of the subtracter 73c. The values of the counter memories 61a-61c thereby become "3", "3", "0", respectively (see a timing (4) in FIG. 6).

Then, at the timing (4), there is a status of having three intervals from the timing (1). Hence, the ending indication of the class 1 is inputted to the read-out control unit 20b from the sequence designation control unit 20a, and the short cell 1 is read from the short cell storage memory 22a. Then, at a timing (5), the respective values of the counter memories 61a-61c become smaller than any values of the reading interval setting registers 64a-64c. Therefore, no sending class indication is sent from the AND circuit 69.

At a timing (6), the respective values of the counter memories 61b, 61c become identical with any values of the reading interval setting registers 64b, 64c corresponding thereto, and there is a status in which the class 2 and the class 3 are to be designated. The class 2 has, however, a higher priority than the class 3, and therefore only the sending indication of the class 2 is outputted from the AND circuit 69. As a matter of course, at a next timing (7), only the value of the counter memory 61c is larger than the reading interval value, and hence the sending indication of the class 3 is outputted from the AND circuit 69 at the timing (7).

Thus, the sequence designation control unit 20a designates the relevant QOS class at every preset reading interval.

Then, if the two or three QOS classes are designated simultaneously, the QOS classes are designated in a sequence according to the priority.

<Effects of Embodiment 1>

According to the short cell multiplexer 40 in the embodiment 1, the sequence designation control unit 20a designates the QOS class at the predetermined reading interval, and the read-out control unit 20b reads the short cell from one of the short cell storage memories 22a-22c provided corresponding to the QOS classes. Then, the thus read short cell 1 is stored in the multiplexed state in the payload 7 of the ATM cell 5, and then sent to the ATM network 32.

Thus, the sequence designation control unit 20a designates the QOS class at the reading interval, so that there is no necessity for preparing the memory areas corresponding to the numbers of the class serial numbers constituting the reading sequence pattern as done in the case of the conventional short cell multiplexer described in the prior art. Consequently, construction of the sequence designation control unit 20a can be simplified and downsized, and it is therefore feasible to restrain the costs for the hardware (the short cell multiplexer 40) from rising.

Further, the storage device stored with the sequence pattern is not required, and hence the resetting of the reading band, with which a change in the sequence pattern and an increase in the QOS classes are concomitant, can be carried out more easily than by the prior art.

Embodiment 2

Next, the short cell multiplexer in accordance with an embodiment 2 will be discussed. According to the prior art method and the method described in the embodiment 1, the short cell 1 stored in one of the FIFOs (the short cell storage memories) 22a-22c is read, at which time a bit rate of the thus read short cell 1 becomes the actual reading band. On the other hand, the short cell 1 is of the variable length type. Therefore, the bit-number of the short cell 1 sent from the first selector 19 in the single reading process becomes different per short cell. Accordingly, it might happen that a predetermined value of the reading band (the sending band) of the short cell 1 is different from the reading band of the short cell 1 actually read (sent from the first selector 19). Further, the reading band (of the short cell 1 in the single reading process) is set according to the priority.

From the above-mentioned, in a case where the short cell 1 stored in each of the FIFOs 22a-22c is always in a standby status for being read (for being sent), if the actual sending band in any one of the plurality of QOS classes is higher than the predetermined value of the sending band of the relevant QOS class, it follows that the sending bands of other QOS classes decrease by a value higher than the predetermined value. Hence, there might be a possibility in which to hinder a smooth transmission of the short cell 1 due to an occurrence of delay in the sending (reading) standby status of the short cell 1. The short cell multiplexer in the embodiment 2 was contrived in view of obviating this problem.

<Construction of Short Cell Multiplexer>

Figure 7:
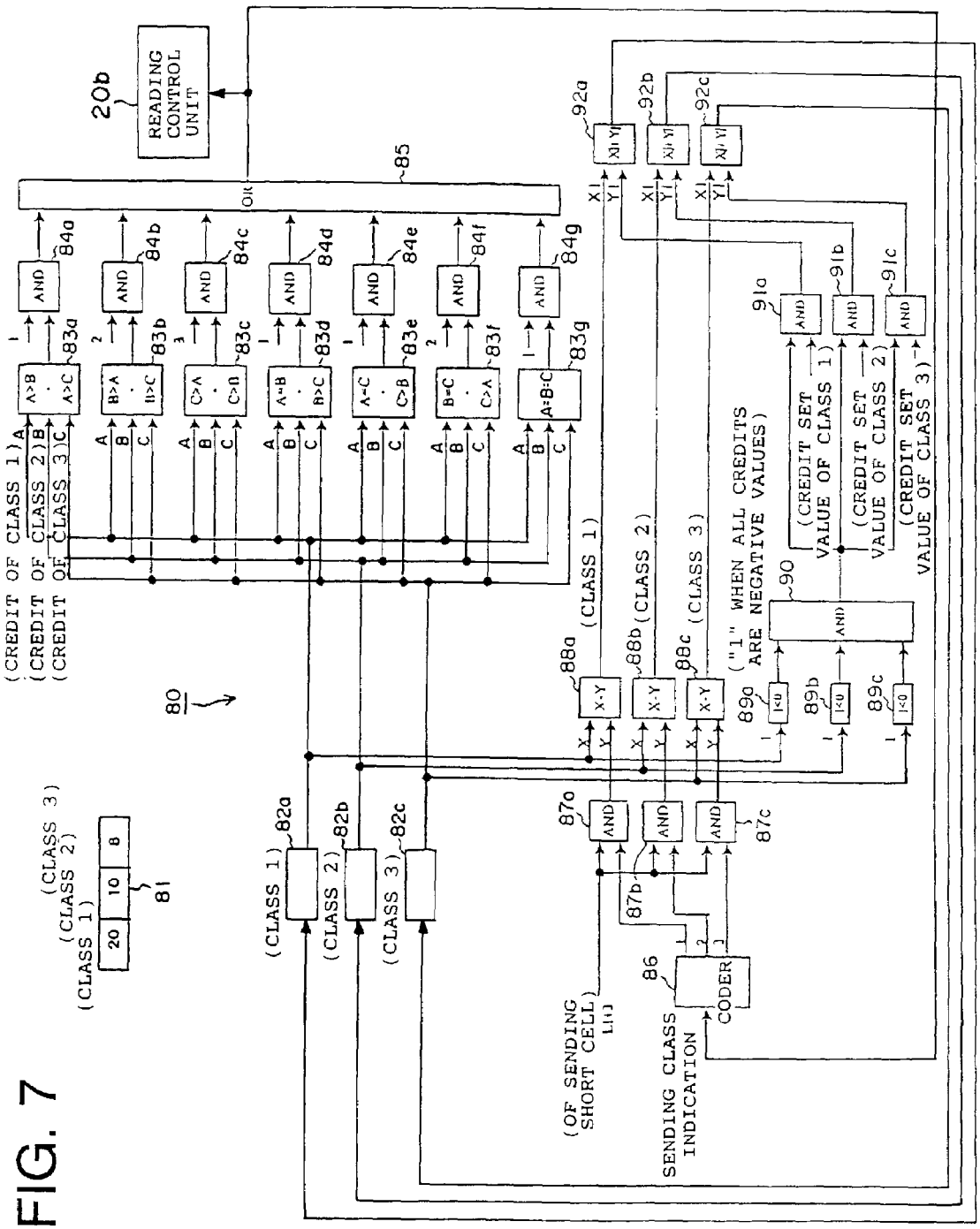
FIG. 7 is a diagram showing a construction of the sequence designation control unit in an embodiment 2.

The short cell multiplexer in the embodiment 2 has a construction common to the short cell multiplexer 40 in the embodiment 1 except for a construction of the sequence designation control unit. Accordingly, only the sequence designation control unit will be described. FIG. 7 is a diagram showing an example of a sequence designation control unit 80 in the short cell multiplexer 40 in the embodiment 2.

The sequence designation control unit 80 shown in FIG. 7, as in the embodiment 1, designates any one of the three QOS classes (the class 1, the class 2, the class 3). That is, the sequence designation control unit 80 has a credit setting register 81 stored with predetermined credit set values according to the QOS classes. Herein, the credit setting register 81 is stored with, e.g., "20" as a credit set value of the class 1, "10" as a credit set value of the class 2, and "8" as a credit set value of the class 3.

Further, the sequence designation control unit 80 includes credit storage registers 82a-82c corresponding to the QOS classes. The credit storage registers 82a-82c provided corresponding to the QOS classes are stored, as initial values, with the respective credit set values stored in the credit setting register 81. Then, the sequence designation control unit 80 designates (outputs a sending class indication) reading of the short cell 1 belonging to the QOS class having the maximum credit set value among the credit set values stored in the credit storage registers 82a-82c.

Therefore, each of the credit storage registers 82a-82c is connected to any one of comparators 83a-83g, which corresponds to the register itself. The comparator 83a is connected to an input terminal of an AND circuit 84a, and the comparator 83b is connected to an input terminal of an AND circuit 84b. Further, the comparator 83c is connected to an input terminal of an AND circuit 84c, and the comparator 83d is connected to an input terminal of an AND circuit 84d. Furthermore, the comparator 83e is connected to an input terminal of an AND circuit 84e, and the comparator 83f is connected to an input terminal of an AND circuit 84f. Further, the comparator 83g is connected to an input terminal of an AND circuit 84g. Then, output terminals of the AND circuits 84a-84g are connected to an input terminal of an OR circuit 85.

Every time the cellulating timing signal or a designation request is inputted to the sequence designation control unit 80, a value of the credit storage register 82a is inputted as "A" to each of the comparators 83a-83g, a value of the credit storage register 82b is inputted as "B" thereto, and a value of the credit storage register 82c is inputted as "C" thereto.

The comparators 83a-83g judge whether or not the inputted values "A", "B", "C" satisfy conditions preset in the comparators themselves. At this time, the comparators 83a-83g, if "A", "B", "C" do not meet the conditions, output the signals of "0", and, whereas if the conditions are met, output the signals "1".

The signal "1" (which is in fact a 2-bit signal of "01") indicating the class 1 is inputted to the other input terminals of the AND circuits 84a, 84d, 84e, 84g. Each of the AND circuits 84a, 84d, 84e, 84g, when inputting the signal "1" from any one comparator corresponding to the AND circuit itself among the comparators 83a, 83d, 83e, 83g, inputs the signal "1" indicating the class 1 to the OR circuit 85.

Moreover, the signal "2" (which is in fact a 2-bit signal of "10") indicating the class 2 is inputted to the other input terminals of the AND circuits 84b, 84f. Each of the AND circuits 84b, 84f, when inputting the signal "1" from any one of the comparators 83b, 83f that corresponds to the AND circuit itself, inputs the signal "2" indicating the class 2 to the OR circuit 85.

Furthermore, the signal "3" (which is in fact a 2-bit signal of "11") indicating the class 3 is inputted to the other input terminal of the AND circuits 84c. The AND circuit 84c, when inputting the signal "1" from the comparator 83c corresponding to the AND circuit itself, inputs the signal "3" indicating the class 3 to the OR circuit 85.

With the construction described above, if two or three credit values among the three credit values stored in the credit storage registers 82a-82c become the same, the sending class indication is outputted in accordance with the predetermined priority (herein, in a sequence of the class 1, the class 2 and the class 3).

The OR circuit 85, if there is no input from any one of the AND circuits 84a-84f (if the signal of "0" is inputted), outputs the signal of "0". While on the other hand, the OR circuit 85, if the signal of any one of "1", "2", "3" is inputted from any one of the AND circuits 84a-84g, inputs this signal as a sending class indication to the read-out control unit 20b (see FIG. 3). The read-out control unit 20b thereby reads the short cell 1 from any relevant one of the short cell storage memories 22a-22c. Further, the sending class indication outputted from the OR circuit 85 is inputted to a coder 86.

Moreover, the sequence designation control unit 80, with respect to the QOS class subjected to the reading process, subtracts the number of bytes of the read short cell 1 form the credit value stored at the present time in the credit storage register corresponding to that QOS class. Then, the sequence designation control unit 80, with a result of this subtraction, updates the credit value of the relevant credit storage register. Further, after executing the above subtraction process, if all the credit values of the credit storage registers 82a-82c take negative values, the credit set value is added to each credit value, and the updating process of the credit storage registers 82a-82c is executed.

Namely, the sequence designation circuit includes an AND circuit 87a corresponding to the class 1, an AND circuit 87b corresponding to the class 2, and an AND circuit 87c corresponding to the class 3. Inputted to one input terminal of each of the AND circuits 87a-87c is a value obtained by adding a value "3" as the number of bytes of the short cell header 2 to LI of the short cell 1 corresponding to the sending class indication of this time that is retained by the LI latch 53 (see FIG. 3), i.e., the number of bytes of the entire short cell 1 (a total length of the short cell 1).

On the other hand, the other input terminals of the respective AND circuits 87a-87c are connected to the above coder 86. The coder 86, when the sending class indication is inputted thereto, inputs the signal of "1" to any one of the AND circuits 87a-87c that corresponds to this sending class indication, and inputs the signal of "0" to other AND circuits 87a-87c the one of which is excluded.

An output terminal of the AND circuit 87a is connected to one input terminal of a subtracter 88a, an output terminal of the AND circuit 87b is connected to one input terminal of a subtracter 88b, and an output terminal of the AND circuit 87c is connected to one input terminal of a subtracter 88c. Each of the AND circuits 87a-88c, when the signal of "1" is inputted from the coder 86, inputs the number of bytes of the short cell 1 as "Y" to any one of the subtracters 88a-88c, which corresponds to the AND circuit itself.

The other input terminal of the subtracter 88a is connected to the credit storage register 82a, the other input terminal of the subtracter 88b is connected to the credit storage register 82b, and the other input terminal of the subtracter 88c is connected to the credit storage register 82c. Inputted as "X" to each of the subtracters 88a-88c is a credit value outputted from any one of the credit storage registers 82a-82c, which corresponds to the subtracter itself. Each of the subtracters 88a-88c, when "X" and "Y" are inputted, performs an arithmetic operation such as "X−Y" and outputs an arithmetic result.

Further, the credit storage register 82a is connected to the comparator 89a, the credit storage register 82b is connected to the comparator 89b, and the credit storage register 82c is connected to the comparator 89c. Inputted as "I" to each of the comparators 89a-89c is a credit value outputted from any one of the credit storage registers 82a-82c, which corresponds to the comparator itself.

Each of the comparators 89a-89c, when the credit value is inputted thereto, judges whether or not this value is under "0". At this time, each of the comparators 89a-89c, if the credit value is larger than "0", outputs the signal of "0", and, if the credit value is under "0", outputs the signal of "1".

The respective comparators 89a-89c are connected to an AND circuit 90. The AND circuit 90 is connected to one input terminal of each of the AND circuits 91a-91c. The AND circuit 90, only when receiving the signals of "0" from all the comparators 89a-89c, outputs the signal of "1", and in other cases outputs the signal of "0".

The credit set value of the class 1 is inputted to the other input terminal of the AND circuit 91a from the credit set register 81, the credit set value of the class 2 is inputted to the other input terminal of the AND circuit 91b from the credit set register 81, and the credit set value of the class 3 is inputted to the other input terminal of the AND circuit 91c from the credit set register 81. Each of the AND circuits 91a-91c, only when receiving the signal of "1" from the AND circuit 90, outputs the credit set value inputted from the credit set register 81.

The above-described subtracter 88a and AND circuit 91a are connected to an adder 92a, the subtracter 88a and the AND circuit 91b are connected to an adder 92b, and the subtracter 88a and the AND circuit 91c are connected to an adder 92c. Inputted as "X1" to any one of the adders 92a-92c is an "X−Y" subtraction result outputted from any one of the subtracters 88a-88c, which corresponds to the adder itself. Inputted also as "Y1" to any one of the adders 92a-92c is the credit set value outputted from any one of the AND circuits 91a-91c, which corresponds to the adder itself.

Each of the adders 92a-92c, when receiving only "X1" (when receiving "0" from any one of the AND circuits 91a-91c), outputs a value of "X1". On the other hand, each of the adders 92a-92c, when receiving "X1" and "Y1", performs an arithmetic operation of "X1+Y1", and outputs an arithmetic result thereof.

Output signals of the adders 92a-92c form updating data of the credit storage registers 82a-82c. More specifically, the credit value of the credit storage register 82a is updated with the output of the adder 92a, the credit value of the credit storage register 82b is updated with the output of the adder 92b, and the credit value of the credit storage register 82c is updated with the output of the adder 92c. Note that the credit storage registers 82a-82c correspond to a credit retaining unit of the present invention, and the AND circuits 87a-87c and the subtracters 88a-88c correspond to a subtracting unit of the present invention. Further, the comparators 83a-83g, the AND circuits 84a-84g and the OR circuit 85 correspond to a class designating unit of the present invention, and the adders 92a-92c correspond to an adding unit of the present invention.

(Designation Control by Sequence Designation Control Unit>

Figure 8:
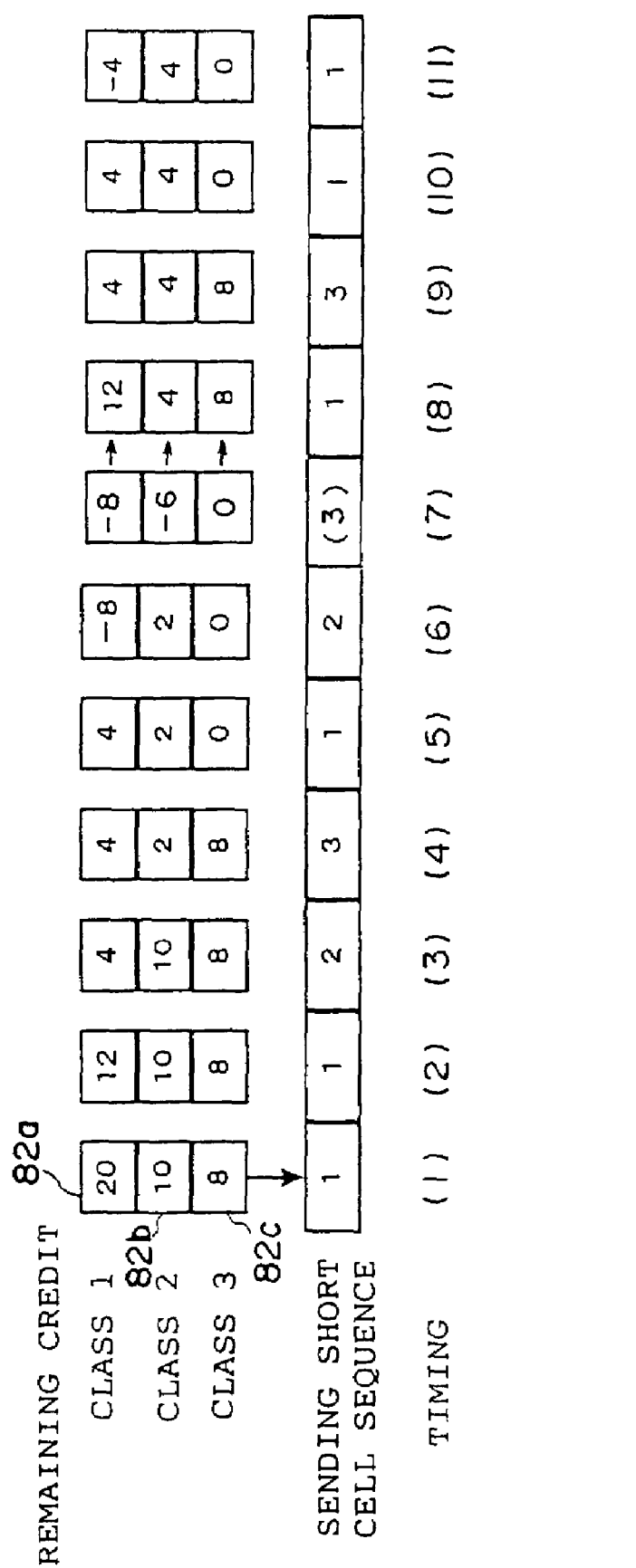
FIG. 8 is an explanatory diagram showing the designation control by the sequence designation control unit shown in FIG. 7.

FIG. 8 is an explanatory diagram showing designation control (a designating method) by the sequence designation control unit 80 illustrated in FIG. 7. Under this designation control, the reading designations (the sending class indications) are implemented in sequence from the short cell 1 belonging to the QOS class having a greater credit value. In this embodiment, however, for making the explanation crystal clear, it is assumed that the total length of the entire short cell 1 is 8 bytes.

For example, at a timing (1) shown in FIG. 8, it is assumed that the credit storage registers 82a-82c be stored as initial values with "20 (bytes)", "10 (bytes)", "8 (bytes)", respectively. Thereafter, when, e.g., the cellulating timing signal is inputted to the sequence designation control unit 80, the values "A", "B", "C" are inputted to the comparators 83a-83f. Herein, "A", "B", "C" satisfy only the condition of the comparator 83a, and therefore the signal of "1" indicating the class 1 is outputted from the AND circuit 84a. Then, *the sending class indication of "1"* is outputted from the OR circuit 85. Accordingly, at the timing (1), the short cell 1 is read from the short cell storage memory 22a (see FIG. 3) corresponding to the class 1.

Further, the sending class indication of "1" outputted from the OR circuit 85 is inputted to the coder 86. Then, the coder 86 outputs the signal of "1" to only the AND circuit 87a corresponding to the class 1. Inputted, on the other hand, to the AND circuit 87a is the total length (LI+3=8 bytes) of the short cell 1 read from the short cell storage memory 22a in response to the relevant sending class indication. Then, this value given by (LI+3) is inputted as "Y" to the subtracter 88a corresponding to the AND circuit 87a. By contrast, the signal of "0" is inputted as "Y" to the subtracters 88b and 88c.

Thereupon, each of the subtracters 88a-88c executes a calculation of "X−Y". At this time, the subtracter 88a subtracts "8" defined as the number of whole bytes of the short cell 1 from the credit value, and "12" is outputted as "X1". In contrast with this, each of the subtracters 88b and 88c executes a process of subtracting "0" from the credit value corresponding to the subtracter itself. Accordingly, "10" is outputted as "X1" from the subtracter 88b, and "8" is outputted as "X1" from the subtracter 88c. Then, the value "X1" outputted from each of the subtracters 88a-88c is inputted to any one of the adders 92a-92c, which corresponds to the one subtracter among the subtracters 88a-88c.

On the other hand, since the credit value of each of the credit storage registers 82a-82c at the timing (1) is over "0", the signal of "0" from any one corresponding circuit of the AND circuits 91a-91c is inputted as "Y1" to each of the adders 92a-92c. Accordingly, each of the adders 92a-92c executes a process of adding "0" to the value "X1" inputted, and outputs a result of this addition. The respective credit storage registers 82a-82c are thereby stored with "12", "10", "8" (see the timing (2) in FIG. 8).

In a case where the credit value of each of the credit storage registers 82a-82c becomes a status at the timing (2), the sequence designation control unit 80, when, e.g., the cellulating timing signal is inputted thereto, carries out the same operation as the one explained with respect to the timing (1). The sending class indication of "1" indicating the class 1 is thereby outputted from the OR circuit 85. Further, with the same operation as the one explained with respect to the timing (1), the respective credit storage registers 82a-82c are stored with "4", "10", "8" (see the timing (3) in FIG. 8).

Subsequently, at the timing (3), with the above-described operation of the sequence designation control unit 80, the sending class indication of "2" indicating the class 2 is outputted from the OR circuit 85, and the credit value of the credit storage register 82b corresponding to the class 2 comes to a value from which subtract "8" indicating the number of all bytes of the short cell 1 (see the timing (4) in FIG. 8).

Thereafter, in a case where the credit values of the credit storage registers 82a-82c come to a state ("−8", "−6", "0") shown in the timing (7) in FIG. 8, when the cellulating timing signal is inputted to the sequence designation control unit 80, the sending class indication of "3" indicating the class 3 is outputted from the OR circuit 85.

Herein, the credit value of each of the credit storage registers 82a-82c at the timing (7) is "0" or under, and hence the signal of "1" is outputted from each of the compactors 89a-89c. Subsequently, the signal of "1" is outputted from the AND circuit 90. Accordingly, the credit set value of the corresponding credit setting register 81 is inputted as "Y1" to the adders 92a-92c from the AND circuits 91a-91c.

With this operation, the adder 92a performs an arithmetic operation such as "X1+Y1=−8+20", and, with this arithmetic result of "12", the credit value of the credit storage register 82a is updated. Further, the adder 92b performs a calculation such as "X1+Y1=−6+10=4", and with this calculated result of "4", the credit value of the credit storage register 82b is updated. Furthermore, the adder 92c performs a calculation such as "X1+Y1=0+8=8", and with this calculated result of "8", the credit value of the credit storage register 82c is updated.

Outputted thereafter at the timing (8) is the sending class indication of "1" indicating the class 1 exhibiting the maximum credit value.

Note that if all the credit values of the credit storage registers 82a-82c become "0" or less, the contrivance is not that the sequence designation control unit 80 outputs the sending class indication but may be that the corresponding set values are added to the credit values stored in the credit storage registers 82a-82c, and there is outputted the sending class indication with respect to the QOS class having the largest credit value as a result of the above addition.

Namely, there may be contrived so that the operations at the timings (7) and (8) in the example shown in FIG. 8 be conducted at the same timing, and the sending class indication (of the class 3) at the timing (7) is not outputted.

The short cell multiplexer 40 in accordance with the embodiment 2 exhibits substantially the same effects as those of the short cell multiplexer 40 in the embodiment 1. Moreover, according to the short cell multiplexer 40 in the embodiment 2, the sequence designation control unit 80 monitors the credit values stored in the credit storage registers 82a-82c, and designates the reading of the short cell 1 belonging to the QOS class having the maximum credit value. Then, the credit value in any one corresponding registers among the credit storage registers 82a-82c is subtracted by the total length (the number of bytes) of the read short cell 1.

Consequently, it never happens that there occurs a difference between the predetermined band based on the reading of the short cell 1 and the band of the actually read short cell 1 as in the embodiment 1. Accordingly, it is feasible to prevent the actual sending band in any of the class 1, the class 2, and the class 3 from being higher than the predetermined band, whereby the delay in the standby for reading other QOS class can be prevented. hence, a smoother transmission of the short cell 1 than in the embodiment 1 can be attained.

Embodiment 3

Next, the short cell multiplexer in accordance with an embodiment 3 will be discussed. In the short cell multiplexer 40 in the embodiment 2, for instance, in the case where an average length (an average number of bytes) of the short cell 1 belonging to a certain specified QOS class is shorter than an average length of the short cell 1 belonging to other QOS class, if the credit set value of the above other QOS class is smaller than the credit set value of the above specified QOS class, the short cell 1 belong to the specified QOS class is burstwise read. Therefore, a deviation is caused in the sending pattern (the reading pattern) of the short cell 1 belonging to each QOS class, with the result that the sending band of the specified QOS class exceeds the predetermined band. This might produce a possibility in which the short cells 1 belonging to other QOS classes are ATM-cell-assembled with a delay. The short cell multiplexer in the embodiment 3 is contrived to obviate this problem.

<Construction of Short Cell Multiplexer>

Figure 9:
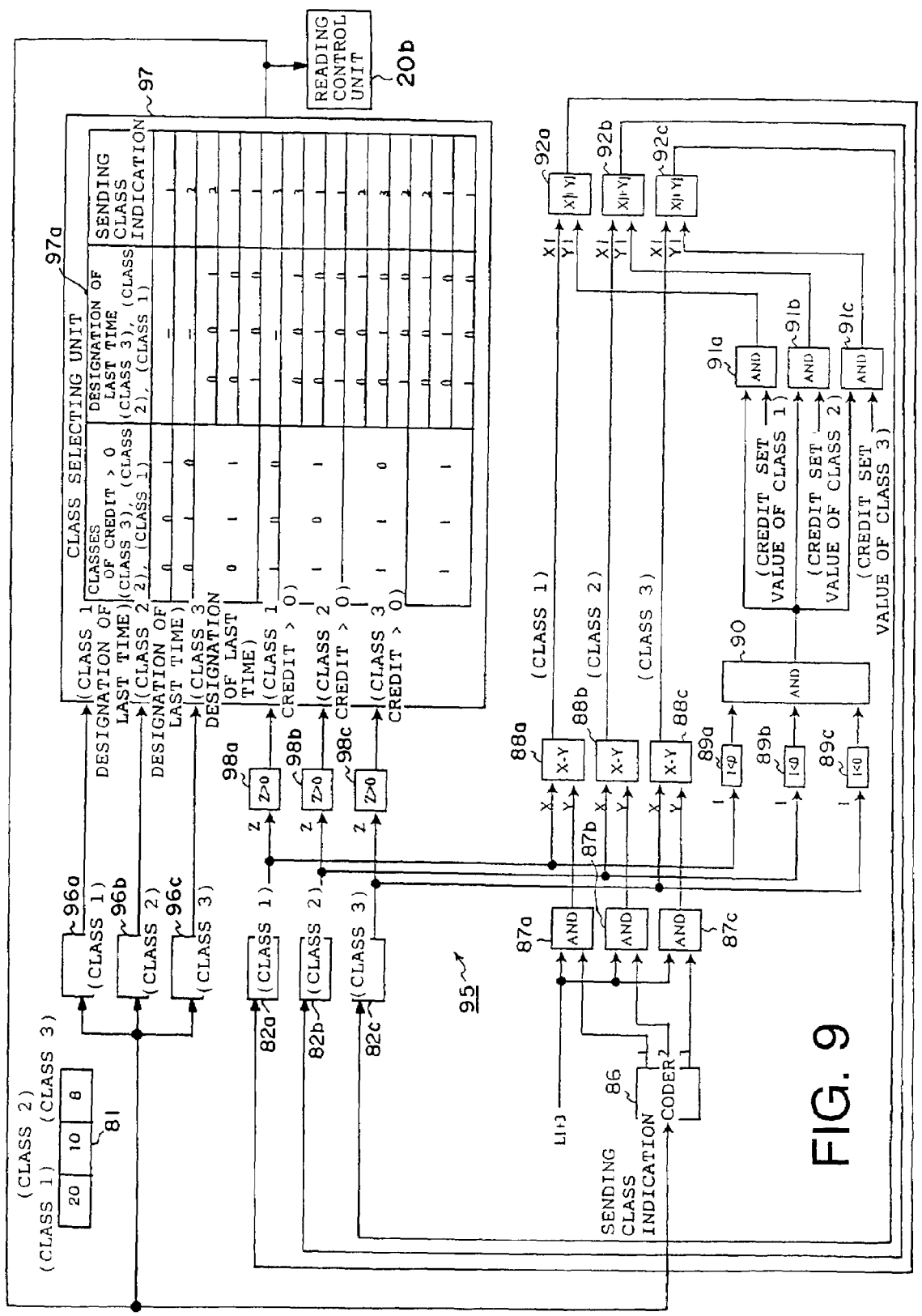
FIG. 9 is a diagram showing a construction of the sequence designation control unit in an embodiment 3.

The short cell multiplexer in the embodiment 3 has a construction common to the short cell multiplexer 40 in the embodiment 1 except for a difference in terms of a construction of the sequence designation control unit. FIG. 9 is a diagram showing an example of a sequence designation control unit 95 in the short cell multiplexer 40 in the embodiment 3.

The sequence designation control unit 95 shown in FIG. 9 gives the sending class indications in a predetermined sequence from the QOS classes with positive credit values. The sequence designation control unit 95 has, however, the constructive elements common to the sequence designation control unit 80 in the embodiment 2, and hence the common components are marked with the same numerals with an explanation omission thereof. Different configurations are explained.

Referring to FIG. 9, the sequence designation control unit 95 includes designation-of-last-time registers 96a-96b for storing the QOS class designated last time so as not to consecutively designate the same QOS class when two of the three credit values stored in the credit storage registers 82a-82c take positive values in the case of designating a next QOS class. The designation-of-last-time register 96a corresponds to the class 1, the designation-of-last-time register 96b corresponds to the class 2, and the designation-of-last-time register 96c corresponds to the class 3.

Each of the designation-of-last registers 96a 0 96c is stored with "1" when the relevant QOS class is designated in the QOS class designation of the last time, and stored with "0" when not designated. For example, if the class 2 is designated in the QOS class designation of the last time, the designation-of-last-time register 96b is stored with "1", and the designation-of-last-time registers 96a, 96c are stored with "0". The designation-of-last-time registers 96a-96c are connected to a class selecting unit 97. Values of the designation-of-last-time registers 96a-96c are inputted to the class selecting unit 97 every time the cellulating timing signal is inputted to the sequence designation control unit 95.

The credit storage register 82a is connected to a comparator 98a, the credit storage register 82b is connected to a comparator 98b, and the credit storage register 82c is connected to a comparator 98c. Each of the credit storage registers 82a-82c, as in the embodiment 2, inputs, as "Z", of its own retained content to any one of the comparators 98a-98c which corresponds to the register itself, each time the cellulating timing signal is inputted to the sequence designation control unit 95.

Each of the comparators 98a-98c, when "Z" is inputted, judges whether or not a value of "Z" is over (positive) "0". At this time, each of the comparators 98a-98c, when the "Z" value is over "0", inputs the signal of "1" to the class selecting unit 97, and when under "0", inputs the signal of "0" to the class selecting unit 97.

The class selecting unit 97 is constructed of, e.g., a processor device. The class selecting unit 97 includes a selection table 97a for selecting the sending class indication on the basis of the input signals from the comparators 98a-98c as well as from the designation-of-last-time registers 96a-96c.

The selection table 97a is stored with a 3-bit signal (class of credit>"0") defined as an output signal from each of the comparators 98a-98c and with a QOS class number defined as a sending class indication laid out corresponding to the 3-bit signal (the designation of the last time) defined as an output signal from each of the designation-of-last-time registers 96a-96c. The class selecting unit 97, upon receiving the output signal from each of the comparators 98a-98c and of the designation-of-last-time registers 96a-96c, reads the corresponding sending class indication from the selection table 97a and then outputs this indication.

For instance, if there is only one QOS class with the positive credit value, the sending class indication with respect to this QOS class is outputted. Further, if the credit values of the plurality of QOS classes take the positive values, the class subjected to no reading process last time is selected. For example, if the QOS class designated last time is the class 2, and when the credit values of all the QOS classes are positive, the (class of credit>"0") in the selection table 97a is "111", and the (designation of last time) becomes "010". then, the sending class indication of the class 1 is selected. Thus, the consecutive designations of the QOS class (the class 2 in this example) designated last time are prevented. Then, the sending class indication outputted from the class electing unit 97 is inputted to the read-out control unit 20b (see FIGS. 3 and 4).

Further, the class selecting unit 97, if there are two QOS classes not designated last time and having the positive credit values among the classes 1-3, selects the QOS class in accordance with the predetermined priority (the class 1, the class 2 and the class 3).

The sending class indication is outputted as the 3-bit signal indicating any one of the classes 1-3 from the class selecting unit 97. That is, in the case of the class 1, "001" is outputted, "010" is outputted in the case of the class, 2, and "011" is outputted in the case of the class 3. Then, the value of one of the designation-of-last-time registers 96a-96c are updated with any one of these sending class indications. With this updating process, "1" is overwritten to any one of the designation-of-last-time registers 96a-96c, which corresponds to the sending class indication, and "0" is overwritten to other registers.

Thereafter, the credit value of each of the credit storage registers 82a-82c is updated based on the sending class indication. The construction for executing this updating process is, however, the same as the one in the embodiment 2 except for such a point that the sending class indication outputted from the class selecting unit 97 is inputted to the coder 86, and hence its explanation is omitted. Note that the class selecting unit 97 may be constructed of a logic circuit performing the above function.

<Designation Control by Sequence Designation Control Unit>

Figure 10:
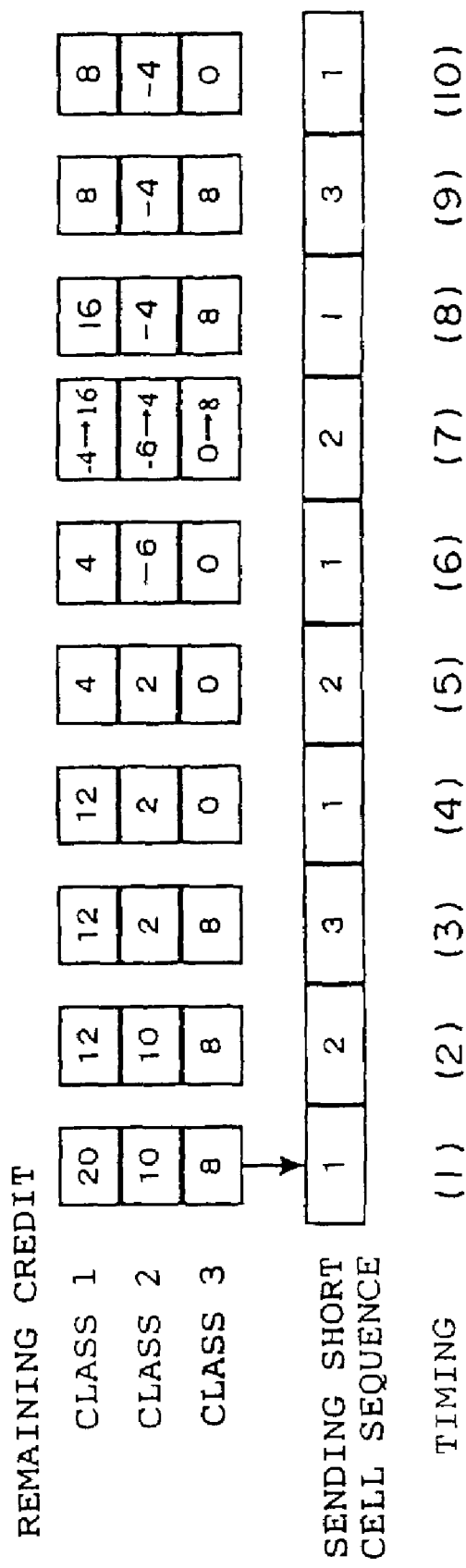
FIG. 10 is an explanatory diagram showing the designation control by the sequence designation control unit illustrated in FIG. 9.

FIG. 10 is an explanatory diagram showing the designation control (the designating method) by the sequence designation control unit 95 shown in FIG. 9. Under this designation control, as in the case of the sequence designation control unit 80 in the embodiment 2, the credit set value is set per QOS class. namely, "20 (bytes)" is set as the credit set value for the QOS class 1, "10 (bytes)" is set as the credit set value for the QOS class, and "8 (bytes)" is set as the credit set value for the QOS class 3. Further, for simplifying the explanation, it is assumed that total byte lengths of the short cells 1 read from the FIFOs 22a-22c are all 8 bytes. The designation method in accordance with this embodiment is, however, different from the designation method in the embodiment 2 in terms such a point as to read the short cells sequentially from within the QOS classes in which the credit values stored in the credit storage registers 82a-82c fall within a range of a certain threshold value (the positive value in the example in FIG. 10).

That is, the credit values of the plurality of QOS classes take the positive values, during which the short cell 1 is read in accordance with the predetermined priority (herein in the sequence of the class 1, the class 2 and the class 3) within those QOS classes. At this time, the QOS class designated last time is excluded from the QOS class to be designated this time in accordance with the values of the designation-of-last-time registers 96a-96c. Hence, the short cells 1 belonging to a certain QOS class are refrained from being read unevenly. The specific operation of the sequence designation control unit 95 is the same in the embodiment 2 except for this point, and the explanation thereof is omitted.

The short cell multiplexer 40 in the embodiment 3 exhibits substantially the same effects as those of the short cell multiplexer in the embodiment 2. Further, according to the short cell multiplexer 40 in the embodiment 2, the sequence designation control unit 95 is so constructed as not to consecutively designate any one of the class 1, the class 2 and the class 3.

Therefore, as in the short cell multiplexer 40 in the embodiment 2, it is feasible to prevent the short cell 1 from being read burstwise from the short cell storage memory 22 corresponding to a certain QOS class. Accordingly, it is possible to prevent the deviation in the reading sequence pattern because of the short cell 1 being read burstwise, prevent the reading band in a certain QOS class from exceeding the predetermined band, and present the delay in the cellulating the short cell 1 belonging to other QOS classes.

Embodiment 4

Next, the short cell multiplexer in accordance with an embodiment 4 will be discussed. The short cell multiplexer in the embodiment 4 has the construction common to the short cell multiplexer 40 in the embodiment 1 except for such a point that the sequence designation control unit has a different configuration. Accordingly, only the sequence designation control unit will be explained. FIG. 11 is a diagram illustrating a configuration of a sequence designation control unit 100 in the short cell multiplexer 40 in the embodiment 4.

Referring to FIG. 11, the sequence designation control unit 100 includes a ratio setting register 101. The ratio setting register 101 is stored with band ratio data about the respective QOS classes (which are herein three classes, i.e., the class 1, the class 2, and the class 3) when the whole is conceived to be one. In accordance with the embodiment 4, the ratio setting register 101 is stored with pieces of ratio data such as 0.5 for the class 1, 0.2 for the class 2 and 0.3 for the class 3 by way of an example of preset ratio data.

Further, the sequence designation control unit 100 includes a predetermined time storage register 102 stored with a sending predetermined time (a time for reading from the short cell storage memory 22) with respect to each of the classes 1-3. This predetermined time storage register 102 is connected to a predetermined time control unit 103. Note that the data relative to some periods of time will be explained in the embodiment 4. The unit of these pieces of data is a byte.

The predetermined time control unit 103 is connected an excessive quantity calculation units 105a-105c provided corresponding to the classes 1-3. The cellulating timing signal is inputted to the predetermined time control unit 103. The predetermined time control unit 103, upon receiving the cellulating timing signal, reads each sending predetermined time (unit: byte) from the predetermined time storage register 102, and inputs this predetermined time to any corresponding one unit among the excessive quantity calculation units 105a-105c. Further, the predetermined time control unit 103 receives an update value of the predetermined time storage register 102 from adders 111a-111c, and, with this update value, updates each sending predetermined time of the predetermined time storage register 102.

Further, the sequence designation control unit 100 has a byte counter 104. A clock and an ATM cell payload enable signal are inputted to the byte counter 104. The byte counter 104 counts up the number of bytes of the payload 7 of the ATM cell 5 on the basis of the inputted clock and ATM cell payload enable signal, and supplies this count value as a present time (unit: byte) to each of the excessive quantity calculation units 105a-105c.

Each of the excessive quantity calculation units 105a-105c receives the sending predetermined time of the corresponding QOS class from the predetermined time control unit 103, and also receives the present time from the byte counter 104. Thereupon, by using those time elements, each of the excessive quantity calculation units 105a-105c calculates an excessive time (an excessive quantity) by which the present time exceeds the sending predetermined time. Whether or not the present time reaches the sending predetermined time is thereby judged. Then, each of the excessive quantity calculation units 105a-105c inputs the calculated excessive quantity (unit: byte) to a sending class judging unit 106.

The sending class judging unit 106, upon receiving the excessive quantities from the excessive quantity calculation units 105a-105c, compares these quantities with each other, and specifies the maximum excessive quantity. Then, the sending class judging unit 106 outputs the sending class indication with respect to the QOS class corresponding to the maximum excessive quantity.

If two or three excessive quantities inputted to the sending class judging unit 106 are identical with each other, however, the sending class judging unit 106 outputs the sending class indication of the QOS class exhibiting the highest priority in accodance with the predetermined priority (the sequence of e.g., the class 1, the class 2 and the class 3). The sending class indication outputted is inputted to the read-out control unit 20b (see FIGS. 3 and 4).

Further, the sequence designation control unit 100, with a construction which follows, updates each value of the predetermined time storage register 102. To be more specific, the sequence designation control unit 100 includes interval calculation units 107a-107c. A total length (LI+3) of the short cell 1 corresponding to the sending class indication outputted from the sending class judging unit 106, is inputted to each of the interval calculation units 107a-107c. The interval calculation unit 107a corresponds to the class 1, the interval calculation unit 107b corresponds to the class 2, and the interval calculation unit 107c corresponds to the class 3.

Each of the interval calculation units 107a-107c performs the following arithmetic operation (Formula 2), thereby calculating a byte interval (till the short cell belonging to the same QOS class as that of the short cell 1 read this time, is read next) of the short cell 1:

Byte Interval=(*LI*+3)×(1−Ratio)/Ratio    (Formula 2)

At this time, each of the interval calculation units 107a-107c, when executing the calculation in the (formula 2), reads the relevant ratio data from the ratio setting register 101 and utilizes the same data. Then, the interval calculation unit 107a inputs the thus calculated byte interval to the adder 108a, the interval calculation unit 107b inputs the calculated byte interval to the adder 108b, and the interval calculation unit 108c inputs the calculated byte interval to the adder 108c.

The byte interval is inputted to each of the adders 108a-108c from any one of the interval calculation units 107a-107c which corresponds to the adder itself, and the total length (LI+3) of the short cell 1 is inputted also to each adder. Thereupon, each of the adders 108a-108c executes an adding process such as "(LI+3)+Byte Interval". Then, the adder 108a inputs an added result to the AND circuit 110a, the adder 108b inputs an added result to the AND circuit 110b, and the adder 108c inputs an added result to the AND circuit 110c.

Further, the sending class indication outputted from the sending class judging unit 106 is inputted to the coder 109. The coder 109, upon receiving this sending class indication, inputs the signal of "0" to any one of the AND circuits 110a-110c, which corresponds to the QOS class designated by the same sending class indication, and inputs the signal of "0" to any one of other AND circuits 110a-110c. For example, when the sending class indication designates the class 1, the signal of "1" is inputted to the AND circuit 110a corresponding to the class 1, while the signal of "0" is inputted to the AND circuit 110b and the AND circuit 110c.

The AND circuit 110a is connected to the adder 111a, the AND circuit 110b is connected to the adder 111b, and the AND circuit 110c is connected to the adder 111c. Each of the AND circuits 110a-110c receives the added result from any one of the adders 108a-108c which corresponds to the circuit itself, and, when receiving the signal of "1" from the coder 109, inputs the above added result to one corresponding adder among the adders 111a-111c. By contrast, each of the AND circuits 110a-110c, when receiving the signal of "0" from the coder 109, outputs the signal of "0".

The sending predetermined time of the class 1 that is stored in the predetermined time storage register 102 is inputted to the adder 111a, the sending predetermined time of the class 2 is inputted to the adder 111b, and the sending predetermined time of the class 3 is inputted to the adder 111c.

The adder 111a, when the added result of the adder 108a is inputted from the AND circuit 110a, adds the sending predetermined time to this added result, and outputs it as a new sending predetermined time. Similarly, the adder 111b, when the added result of the adder 108b is inputted from the AND circuit 110b, adds the sending predetermined time to this added result, and outputs it as a new sending predetermined time. Similarly, the adder 111c, when the added result of the adder 108c is inputted from the AND circuit 110c, adds the sending predetermined time to this added result, and outputs it as a new sending predetermined time.

In contrast with this, each of the adders 111a-111c, when the signal of "0" is inputted from any one of the AND circuits 110a-110c which corresponds to the adder itself, outputs "0". Accordingly, there is updated only the sending predetermined time of the QOS class corresponding to the sending class indication outputted from the sending class judging unit 106.

The new sending predetermined time outputted from each of the adders 111a-111c, is supplied to the predetermined time control unit 103 as an update value of the predetermined time storage register 102. Thereupon, the predetermined time control unit 103 updates the relevant sending predetermined time with this update value. Accordingly, each of the update values (a next sending predetermined time) of the classes 1-3 that are stored in the predetermined timing storage register 102, is obtained by the following (formula 3). That is:

Next Sending Predetermined Time=(Relevant Short Cell Sending Predetermined Time)+(Relevant Short Cell Total Length)+(Byte Interval)    (Formula 3)

Note that the ratio setting register 101 may not be provided on condition that each of the interval calculation units 107a-107c is so constructed as to hold the relevant ratio data.

<Designation Control by Sequence Designation Control Unit>

Next, the designation control (the designation method) by the above sequence designation control unit 100 will be explained. FIGS. 12(A) and 12(B) are explanatory diagrams showing the designation control by the sequence designation control unit 100 illustrated in FIG. 11.

Under the designation control shown in FIGS. 12(A) and 12(B), there is preset a band ratio of each of the short cells 1 stored in the short cell storage memories 22a-22c. Herein, by way of an example, the band ratio for the class 1 is set to "0.5", the band ratio for the class 2 is set to "0.2", and the band ratio for the class 3 is set to "0.3". The sequence designation control unit 100 calculates a byte interval to a start of reading the next short cell 1 belonging to the same QOS class by use of the total length of the short cell 1 read from any one of the short cell storage memories 22a-22c. A next sending predetermined time is thereby calculated.

FIG. 12(A) shows a reading pattern of the short cell 1 in a case where only the short cell storage memory 22a (corresponding to the class 1) illustrated in FIG. 3 is stored with the plurality of short cells 1. For explanatory simplicity, however, it is assumed the plurality of short cells 1 stored in the short cell storage memory 22a all have a total length of 8 bytes.

When the sending class indication of the class 1 is outputted from the sending class judging unit 106, the read-out control unit 20a reads the short cell 1 out of the short cell storage memory 22a, and sends it from the first selector 19 (see FIG. 3). Thereupon, the total length (LI+3=8 bytes) of the short cell 1 is inputted to the interval calculation unit 107a via a latch 53 and an unillustrated adder. Then, the interval calculation unit 107a performs the arithmetic operation in the above-described (formula 2). That is:

Byte Interval=8×(1−0.5)/0.5=8 Bytes

An arithmetic result thereof is thus obtained. This arithmetic result is inputted to the adder 108a. The adder 108a adds 8 bytes defined as the total length of the short cell 1 to 8 bytes as the arithmetic result by the interval calculation unit 107a. Then, the adder 108a inputs, to the AND circuit 110a, 16 bytes as a result of the adding process by the adder itself.

Herein, the sending class indication of the class 1 is inputted to the coder 109 from the sending class judging unit 106. The coder 109 inputs the signal of "0" to the AND circuits 110b, 110c as well as inputting the signal of "1" to the AND circuit 110a. Then, 16 bytes defined as the output signal of the adder 108a are inputted to the adder 111a from the AND circuit 110a.

Subsequently, the adder 111a adds 16 bytes inputted from the AND circuit 110a to the sending predetermined time of the class 1 that is received from the predetermined time storage register 102, and outputs a result of this addition as an update value of the sending predetermined time of the class 1. Then, the update value outputted from the adder 111a is supplied to the predetermined time control unit 103. The predetermined time control unit 103 updates, with the update value received, the sending predetermined time of the class 1 in the predetermined time storage register 102.

With this updating process, there is set a 16-byte interval from the sending predetermined time of the short cells 1 of the class 1 of the last time to the sending predetermined time of the short cell 1 of the next class 1, and an 8-byte interval is also set as an interval of reading the short cell 1.

Thereafter, the same process is executed, whereby the sending class indication of the class 1 is outputted from the sequence designation control unit 100 at the interval of 16 bytes, and the short cell 1 is read at the 8-byte interval from the short cell storage memory 22a.

FIG. 12(B) illustrates a pattern of reading the short cell 1 in a case where the plurality of short cells 1 are stored in the short cell storage memory 22a corresponding to the class 1 and in the short cell storage memory 22b corresponding to the class 2. For simplifying the explanation, however, it is assumed that the plurality of short cells 1 stored in the short cell storage memories 22a, 22b all have a total length of 8 bytes. Further, it is also assumed that the predetermined time storage register 102 be stored with the sending predetermined times for the class 1 and the class 2, and that the sending predetermined time for the class 1 be set to a time earlier than the sending predetermined time for the class 2.

Referring to FIG. 12(B), when, to begin with, the sending class indication of the class 1 is outputted, as explained with reference to FIG. 12(A), there is set the 16-byte interval to the time when the sending class indication of the class 1 is outputted next. Subsequently, the sequence designation control unit 100 outputs the sending class indication of the class 2 in accordance with the sending predetermined time in the predetermined time storage register 102. Thereupon, the short cell 1 belonging to the class 2 is read from the short cell storage memory 22b, and sent from the first selector 19.

Then, the total length (8 bytes) of the short cell 1 of the class 2 is inputted to the interval calculation unit 107b. The interval calculation unit 107b calculates a byte interval by use of the total length of the short cell 1 and the band ratio (0.2) of the class 2. That is, the interval calculation unit 107b performs the following arithmetic operation:

Byte Interval=8×(1−0.2)=32 Bytes

The interval calculation unit 107b inputs 32 bytes as a result of this arithmetic operation to the adder 108b. With this processing, thereafter, an update value of the sending predetermined time of the class 2, into which 40 bytes are added to the sending predetermined time of the last time, is outputted from the adder 111a. With this update value, the sending predetermined time of the class 2 in the predetermined time storage register 102 is updated. Accordingly, the 32-byte interval is provided between the short cell 1 of the class 2 which has been read last time and the short cell 1 of the class 2 which is read this time.

Hence, the sending class indication of the class 1 is outputted at the interval of 8 bytes from the sequence designation control unit 100, and the sending class indication of the class 2 is outputted at the interval of 32 bytes therefrom. Therefore, the short cells 1 can be read from the short cell storage memories 22a, 22b while controlling the band for every QOS class in accordance with the predetermined ratio.

The short cell multiplexer 40 in the embodiment 4 exhibits substantially the same effects as those of the short cell multiplexer 40 in accordance with each of the embodiment 1-3. Further, according to the short cell multiplexer 40 in the embodiment 4, a predetermined sending time (an interval of reading the short cells 1 belonging to the same QOS class) of the next short cell 1 is obtained based on the total length of the short cell 1 read from each of the short cell storage memories 22a, 22b, and the sending class indication is outputted in accordance with this predetermined sending time. Therefore, it is feasible to hold the set band with respect to each QOS class without depending on the total length of the short cell 1 (stored in any one of the short cell storage memories 22a-22c) arriving at the radio base station 31 illustrated in FIG. 1, and also to evenly divide the intervals of reading the short cells per QOS class.

Furthermore, in accordance with the embodiments 1-4, when multiplexing the plurality of short cells on the single ATM connection, the reading band for every class can be directly set without designating the reading sequence pattern per QOS class as done in the prior art. Therefore, it is possible to restrain the costs for the hardware from rising and to reduce the process of changing the reading band.

Moreover, in accordance with the embodiments 2-4, the short cell 1 can be read while keeping the preset reading band irrespective of the total length of the short cell 1. Hence, the delay in the cellulating process in other QOS classes can be restrained by class and the actually read band.

Incidentally, the sequence designation control unit 100 shown in FIG. 11 takes such a construction that the ratio setting register 101 is provided, and each of the interval calculation units 107a-107c calculates the byte interval by obtaining the relevant value from the ratio setting register 101. The sequence designation control unit 100 may be, however, constructed so that each of the interval calculation units 107a-107c retains a pre-calculated value as a value given by "(1−Ratio)/Ratio", which is used when each of the interval calculation units 107a-107c calculates the byte interval. In this case, the processing time required for calculating the byte interval can be restrained down to a smaller value.

Further, in the example shown in FIG. 11, there is provided the byte counter 104 for counting up the number of bytes of the payload 7 of the ATM cell 5, an absolute time based on the count value (the number of bytes) outputted from this byte counter 104 is set as a present time, and the sending predetermined time of the short cell 1 is calculated by use of this present time. Instead of this, however, the sequence designation control unit 100 may be so constructed as to calculate the sending predetermined time of the short cell 1 by use of a relative time.

Figure 13:
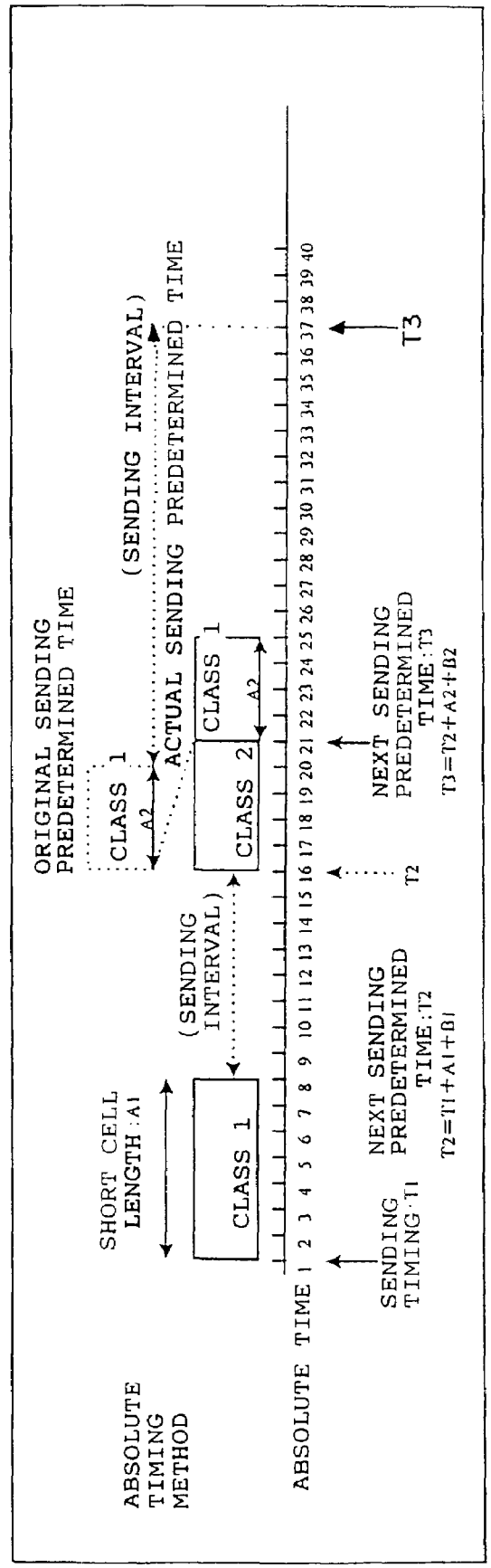
FIG. 13 is a conceptual diagram showing a process of calculating a sending predetermined time by use of an absolute time.
Figure 14:
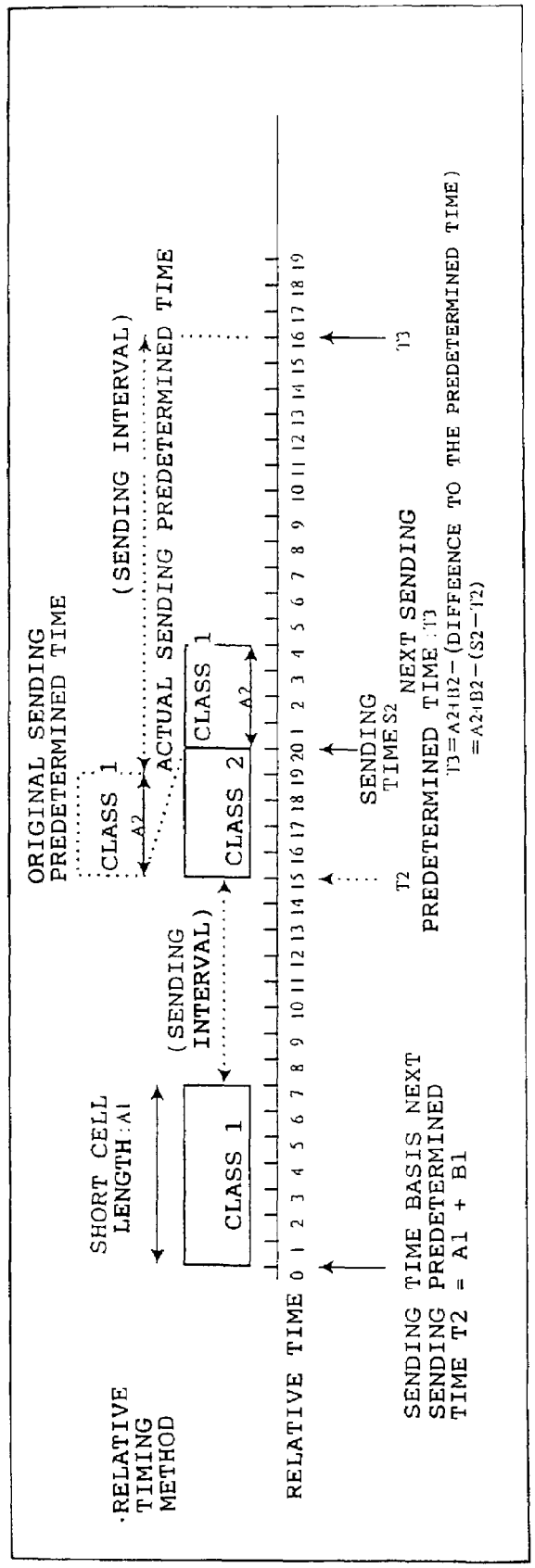
FIG. 14 is a conceptual diagram showing a process of calculating the sending predetermined time by use of a relative time.

FIG. 13 is a conceptual diagram in the case of using the absolute time. FIG. 14 is a conceptual diagram in the case of using the relative time. As shown in FIG. 13, in the case of using the absolute time, a fiducial time when calculating the byte interval is set as the sending predetermined time of the relevant short cell 1. On the other hand, as shown in FIG. 14, in the case of using the relative time, for instance, when the sending predetermined of the short cell 1 belonging to the class 1 becomes a fiducial time, a next sending predetermined time is calculated by use of the following (formula 4). That is:

Next Sending Predetermined Time=(Difference from Sending Predetermined Time)+(Total Length Present Short Cell)+(Byte Interval)   (Formula 4)

The sending predetermined time is thus calculated.

Further, in the embodiments 1-4, the memories or the registers are used for storing and retaining the various items of set information. However, a register and a latch device involving the use of a flip-flop may substitute for the memory, and storage device such as a memory may also substitute for the register. Moreover, in the embodiments 1-4, the read-out control unit and the sequence designation control unit are constructed of the hardware (the electronic circuits). The read-out control unit and the sequence designation control unit may, however, be each constructed of a processor device consisting of a memory for storing a program and data and a CPU for executing the program, as far as being capable of performing the above functions.

It is apparent that, in this invention, a wide range of different working modes can be formed based on the invention without deviating from the spirit and scope of the invention. This invention is not restricted by its specific working modes except being limited by the appended claims.

What is claimed is:

1. A short cell multiplexer for multiplexing, in a cell, a plurality of variable-length short cells, comprising:
    storing means for storing a short cell that belongs to one of a plurality of classes, per class;
    a designator for designating a class of a short cell to be read at next reading timing based on length and a class of a short cell designated at previous reading timing; and
    reading means for reading a short cell corresponding to a class designated by said designator from said storing means.

2. A short cell multiplexer according to claim 1, wherein a credit value corresponding to each of the plurality of classes is held, the designator designates one of the classes having a maximum credit value at each reading timing, when a short cell of the one of classes is read by the reading means, a length of the short cell of the one of classes is subtracted from the credit value corresponding to the one of classes.

3. A short cell multiplexer for multiplexing, in a cell, a plurality of variable-length short cells, comprising:
    storing means for storing a short cell that belongs to one of a plurality of classes, per class;
    a calculator for respectively calculating next reading predetermined timing of short cells of each of classes based on length of short cells of each of classes respectively read last from said storing means;
    a designator for designating a class of reading that comes earliest within the predetermined timing calculated by said calculator, as a class of a short cell to be read; and
    reading means for reading a short cell corresponding to a class designated by said designator from said storing means.

* * * * *